(12) United States Patent
Nakanishi

(10) Patent No.: US 8,583,719 B2
(45) Date of Patent: Nov. 12, 2013

(54) METHOD AND APPARATUS FOR ARITHMETIC OPERATION BY SIMULTANEOUS LINEAR EQUATIONS OF SPARSE SYMMETRIC POSITIVE DEFINITE MATRIX

(75) Inventor: Makoto Nakanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 855 days.

(21) Appl. No.: 12/697,342

(22) Filed: Feb. 1, 2010

(65) Prior Publication Data

US 2010/0241683 A1 Sep. 23, 2010

(30) Foreign Application Priority Data

Mar. 19, 2009 (JP) ................................. 2009-068957

(51) Int. Cl.
*G06F 7/38* (2006.01)
*G06F 7/32* (2006.01)

(52) U.S. Cl.
USPC .......................................... 708/446; 708/520

(58) Field of Classification Search
USPC .......................................... 708/446, 520, 607
See application file for complete search history.

(56) References Cited

U.S. PATENT DOCUMENTS

| 8,125,883 B2 * | 2/2012 | Aulin | 370/203 |
| 2004/0148324 A1 * | 7/2004 | Garg | 708/446 |
| 2008/0025633 A1 * | 1/2008 | Szeliski | 382/274 |

FOREIGN PATENT DOCUMENTS

JP 2009-25962 A 2/2009

OTHER PUBLICATIONS

Dongarra et al., "A New Recursive Implementation of Sparse Cholesky Factorization", pp. 1-6, 2000.*
Timothy, A. D. "Direct Methods for Sparse Linear Systems", Society for Industrial and Applied Mathematics, Philadelphia, 2006.
Yamamoto, Yusaku, "Development and Evaluation of a Direct Solver for Sparse Symmetric Systems on Distributed-memory Parallel Processors," published by Information Processing Society of Japan, May 15, 2000, vol. 41, No. 5, pp. 1567-1576 (CS-NG-2001-00361-032), with English-language Abstract.
Japanese Office Action mailed Jun. 25, 2013 for corresponding Japanese Application No. 2009-068957, with English-language Translation.
Japanese Office Action mailed Oct. 1, 2013 for corresponding Japanese Application No. 2009-068957, with English-language translation.

* cited by examiner

*Primary Examiner* — Chuong D Ngo
(74) *Attorney, Agent, or Firm* — Fujitsu Patent Center

(57) ABSTRACT

An arithmetic operation apparatus includes: a branch node set detection unit to detect a set of branch nodes for each parallel level; a subtree memory storage area allocation unit to allocate an arithmetic result of a column vector to a memory storage area selected on a basis of a predetermined selection rule from a plurality of memory storage areas; and a node memory storage area allocation unit to allocate an arithmetic result of a column vector to a memory storage area selected on a basis of a predetermined selecting rule from a plurality of memory storage areas.

6 Claims, 17 Drawing Sheets

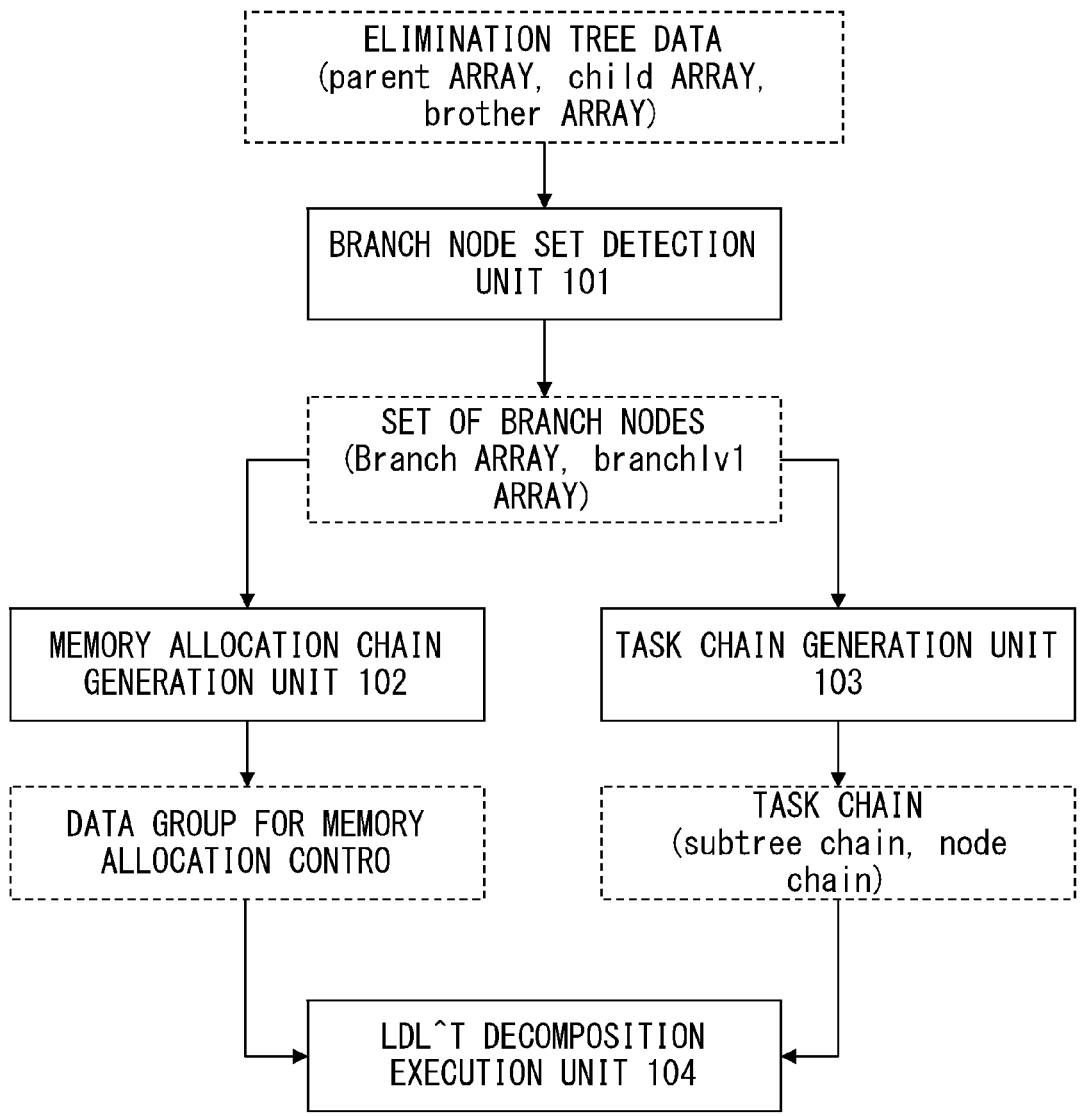
F I G. 1

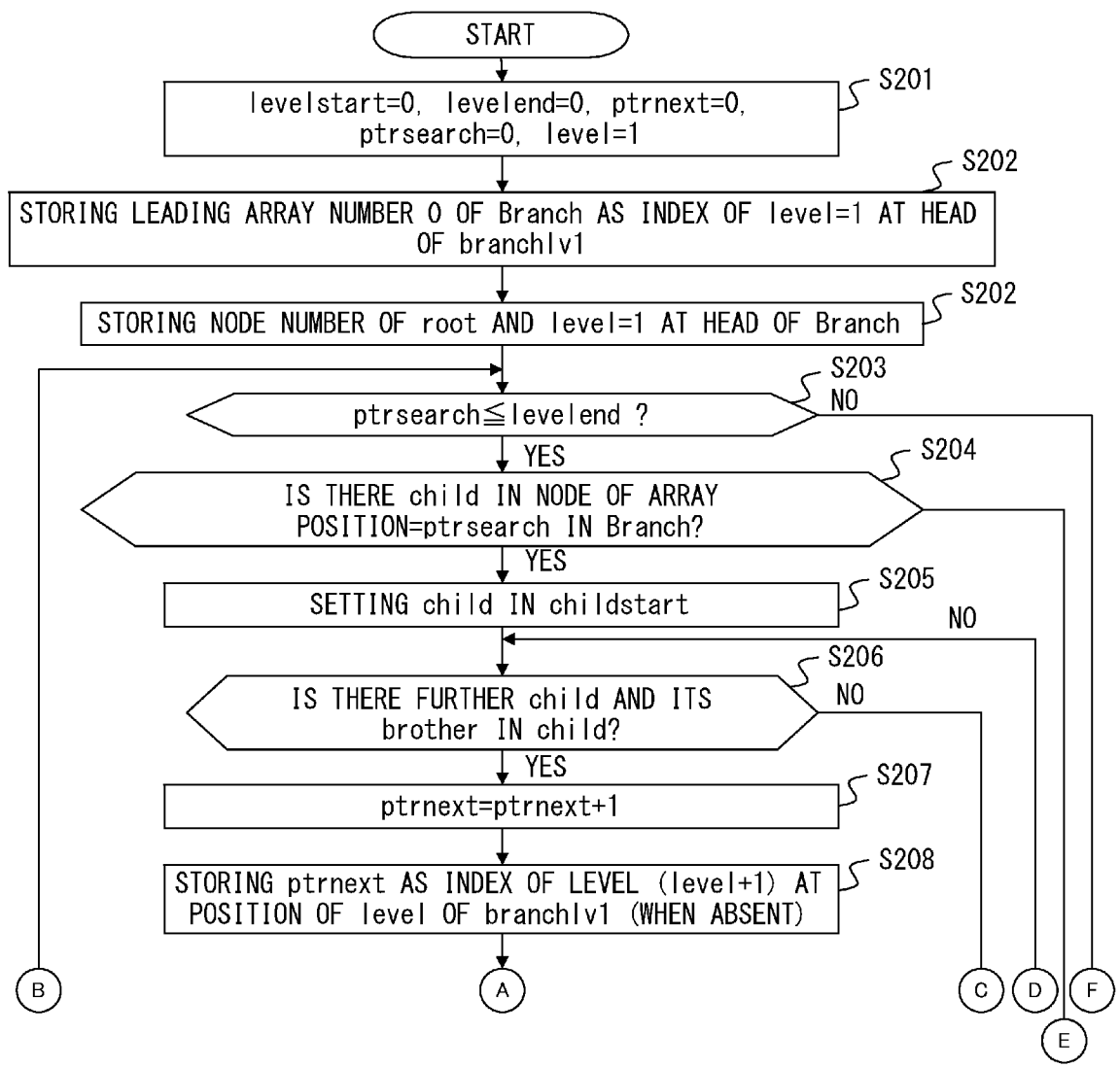
F I G. 2A

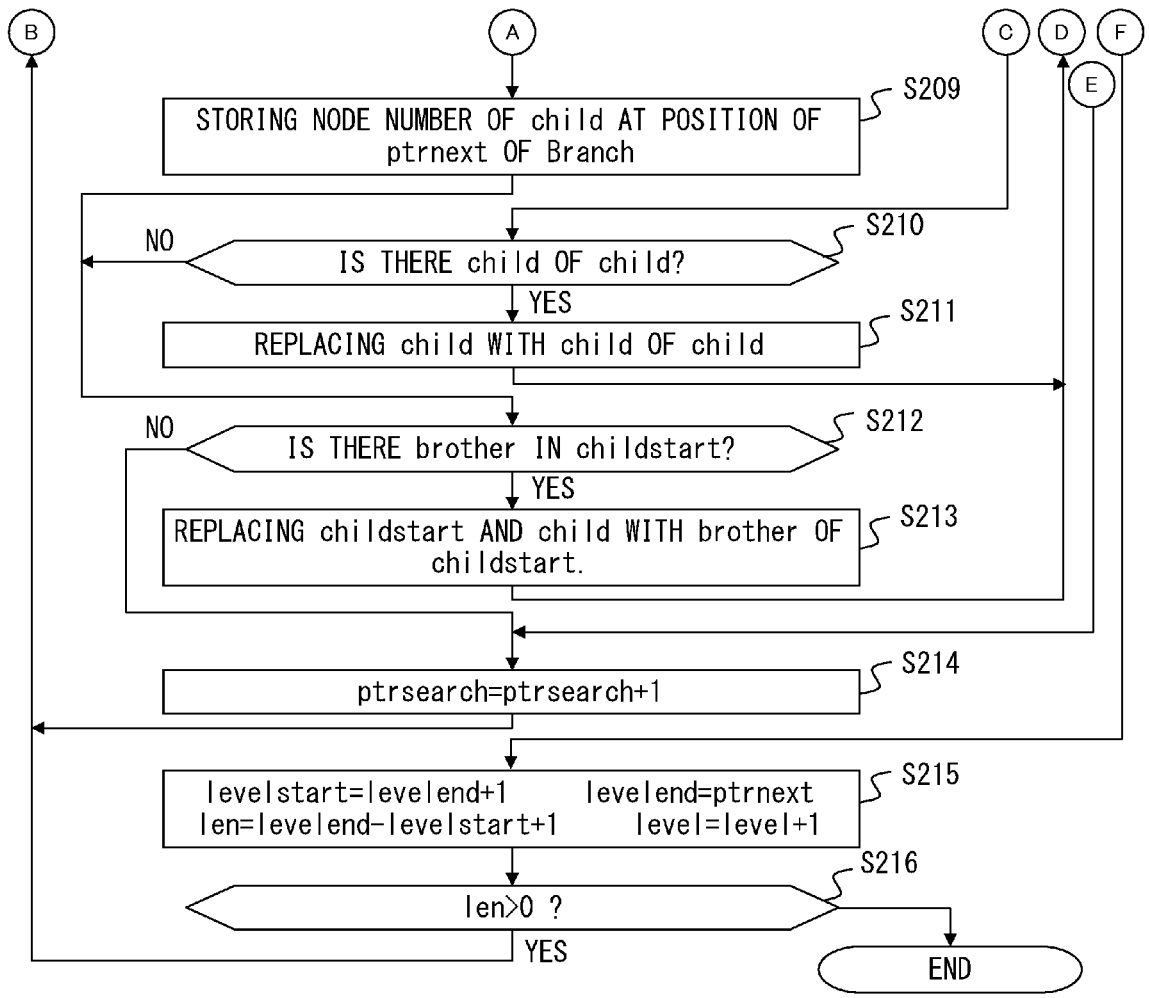
F I G. 2B

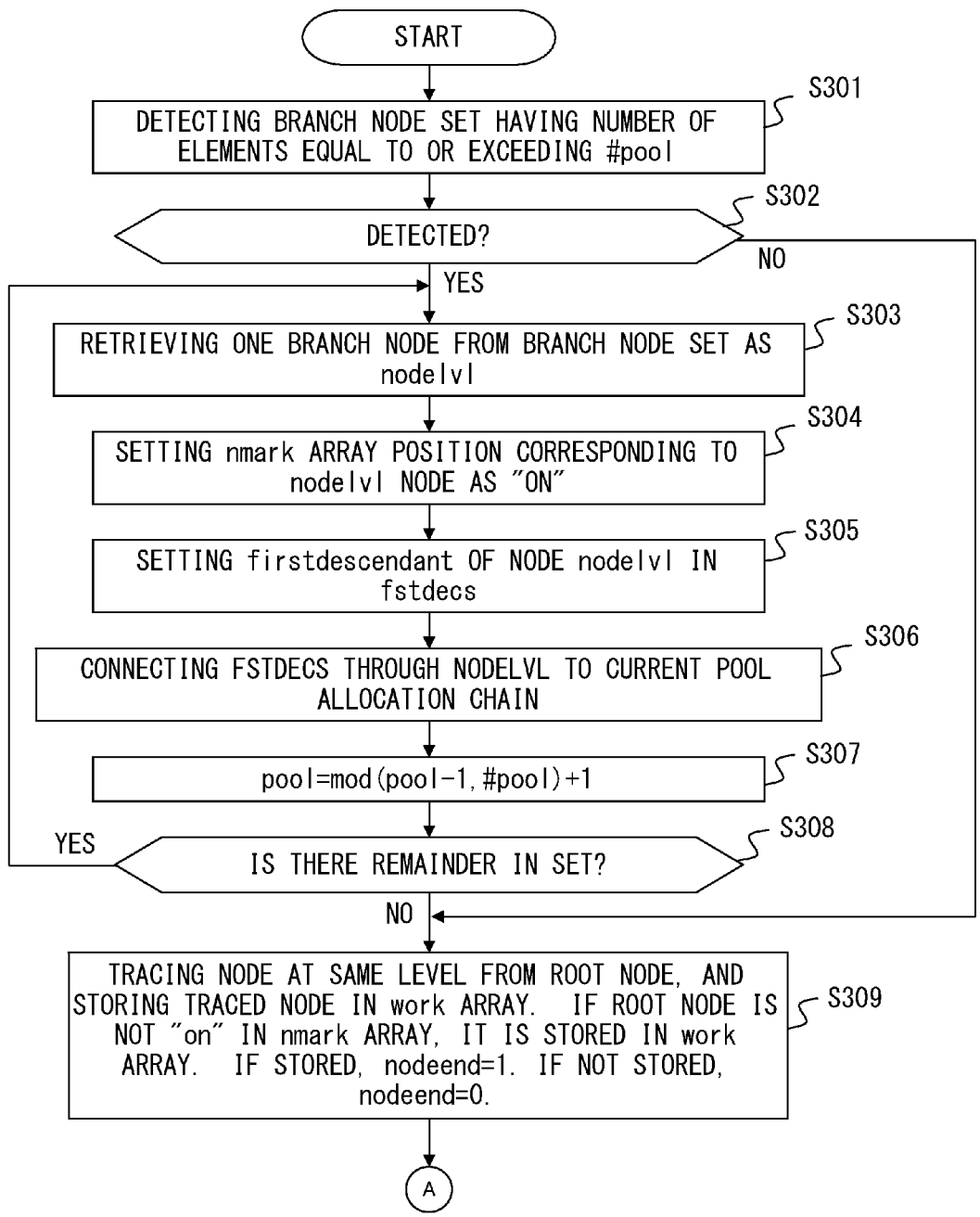
F I G. 3 A

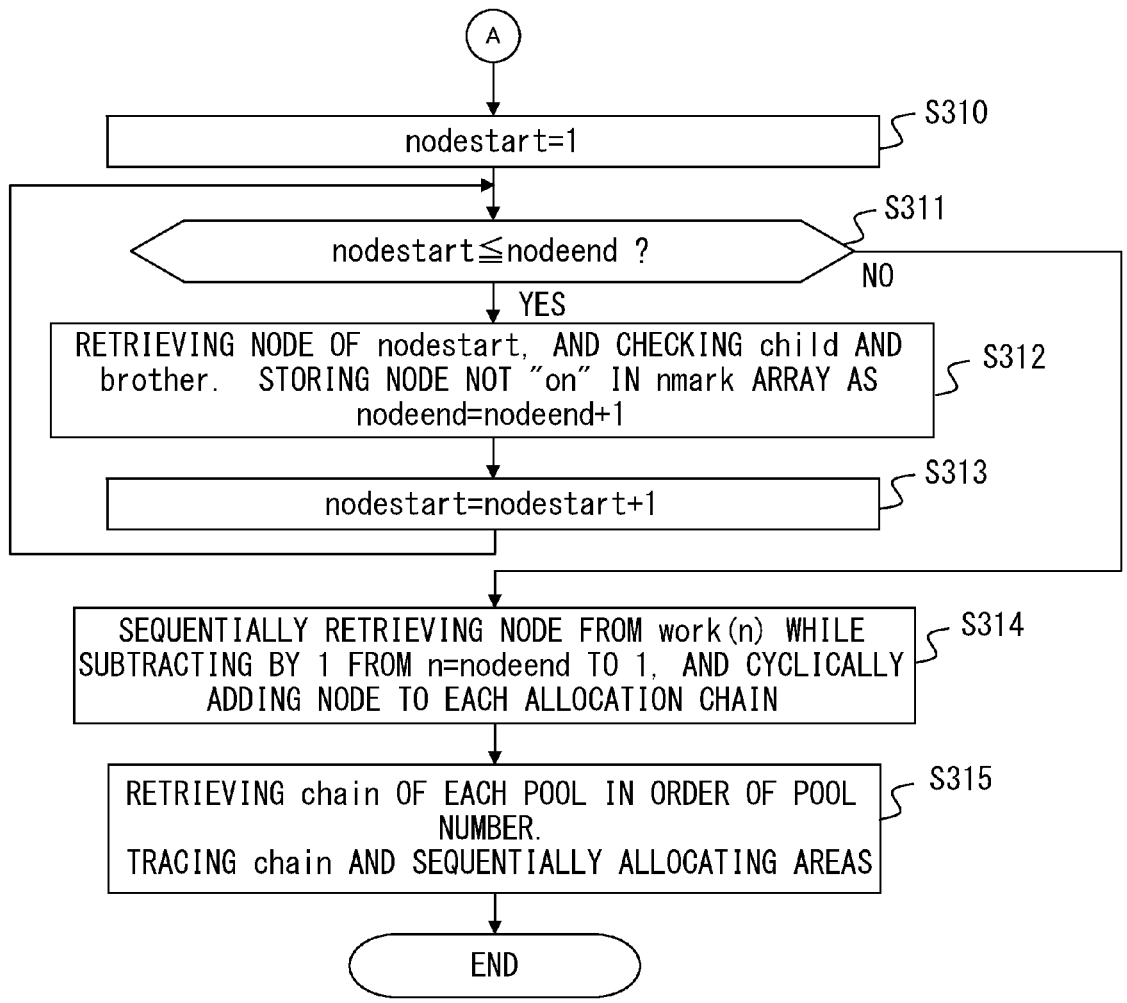
F I G. 3 B

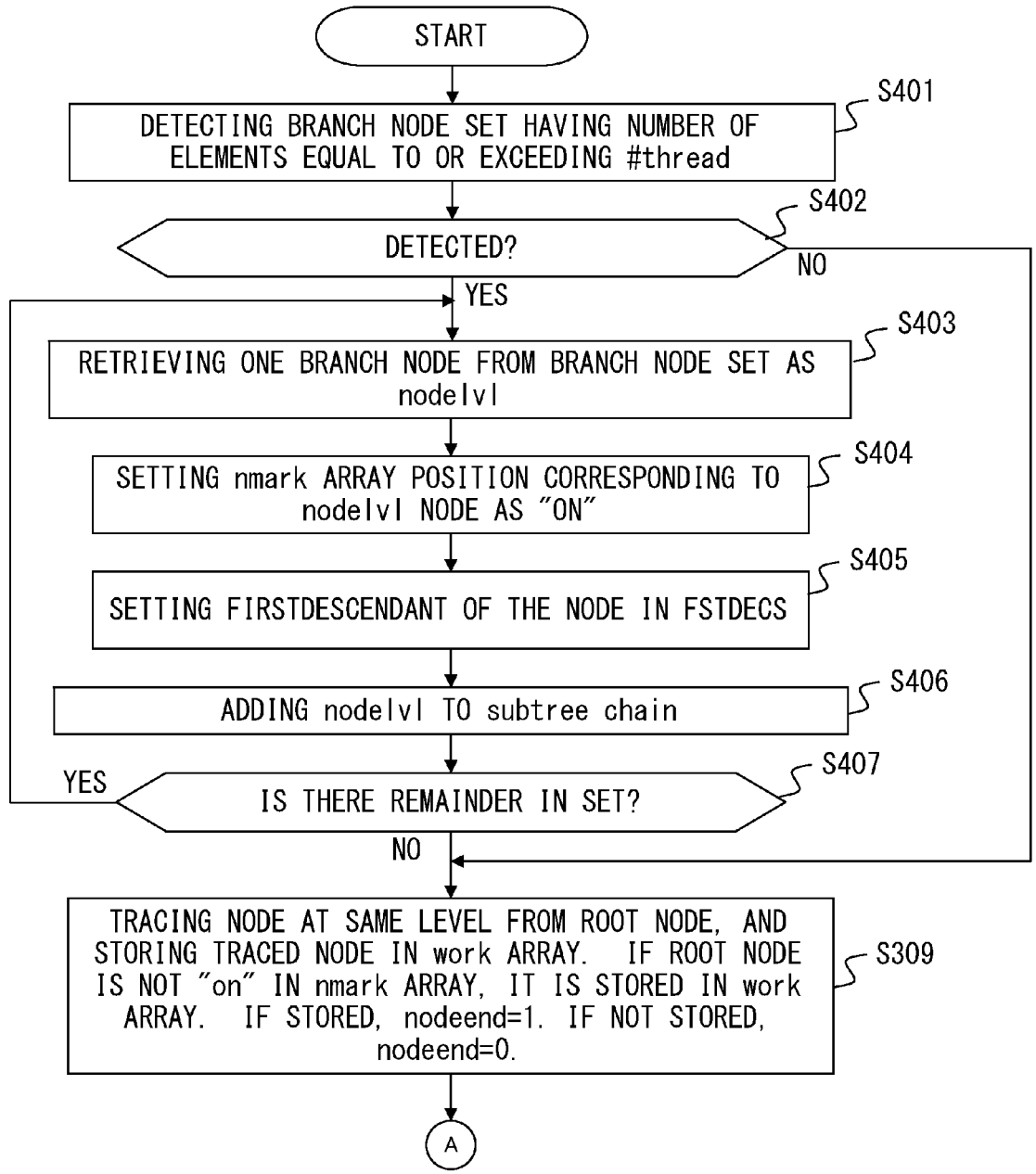
F I G. 4 A

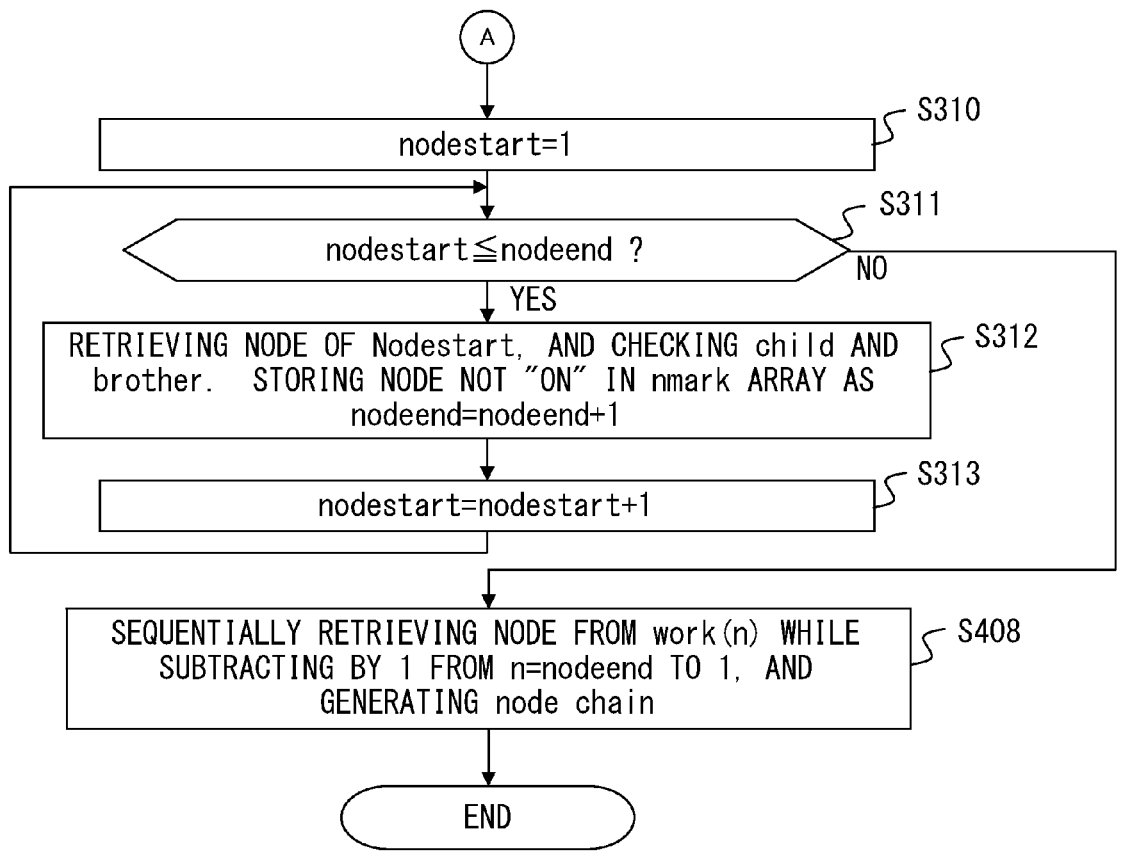
F I G. 4 B

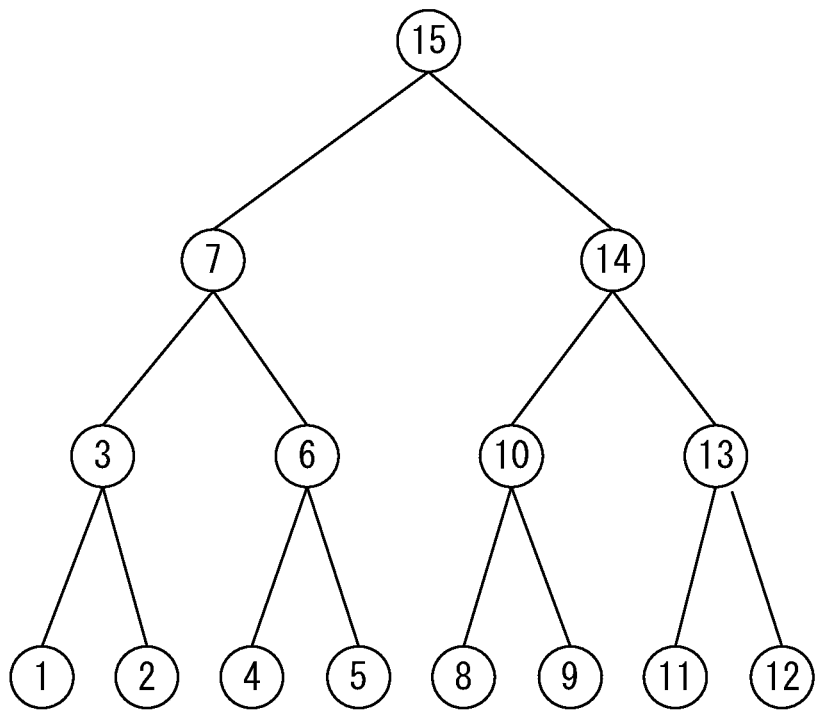
F I G. 6

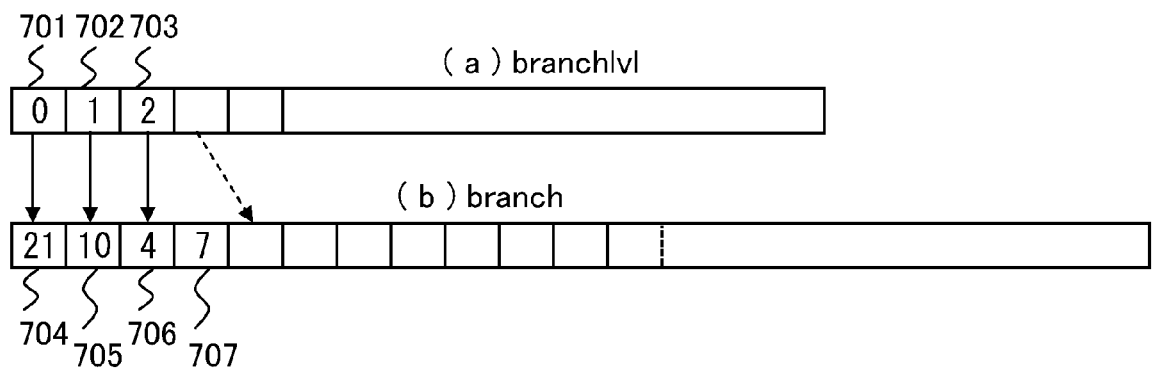
F I G. 7

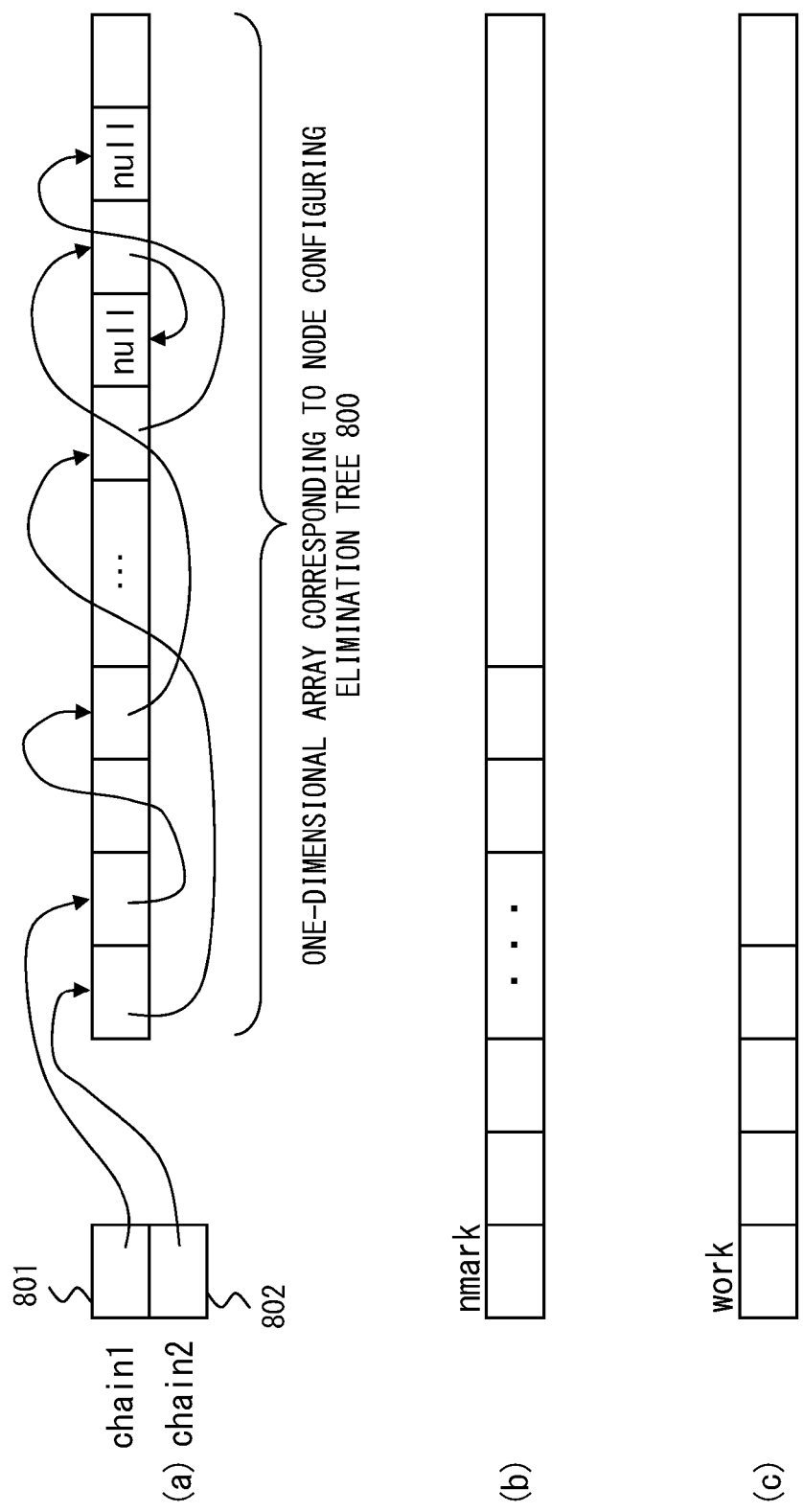
F I G. 8

| nodestart | nodeend | OBJECT NODE | work ARRAY | STEP | ROW |
|---|---|---|---|---|---|
| | 1 | | 21 | S309 | 1 |
| 1 | | | | S310 | 2 |
| | | | | S311 | 3 |
| | 2 | (21) | 10 | S312 | 4 |
| | | | 20 | | 5 |
| 2 | 3 | | | S313 | 6 |
| | | | | S311 | 7 |
| 3 | 4 | (10) | 9 | S312 | 8 |
| | | | | S313 | 9 |
| | | | | S311 | 10 |
| 4 | 5 | (20) | 19 | S312 | 11 |
| | | | | S313 | 12 |
| | | | | S311 | 13 |
| 5 | 6 | (9) | 8 | S312 | 14 |
| | | | | S313 | 15 |
| | | | | S311 | 16 |
| 6 | 7 | (19) | 18 | S312 | 17 |
| | | | | S313 | 18 |
| | | | | S311 | 19 |
| | | (8) | | S312 | 20 |
| 7 | | | | S313 | 21 |
| | | | | S311 | 22 |
| | 8 | (18) | 17 | S312 | 23 |
| 8 | | | | S313 | 24 |
| | | | | S311 | 25 |
| | 9 | (17) | 16 | S312 | 26 |
| 9 | | | | S313 | 27 |
| | | | | S311 | 28 |
| | 10 | (16) | 15 | S312 | 29 |
| 10 | | | | S313 | 30 |
| | | | | S311 | 31 |
| | 11 | (15) | 14 | S312 | 32 |
| 11 | | | | S313 | 33 |
| | | | | S311 | 34 |
| | 12 | (14) | 13 | S312 | 35 |
| 12 | | | | S313 | 36 |
| | | | | S311 | 37 |
| | 13 | (13) | 12 | S312 | 38 |
| 13 | | | | S313 | 39 |
| | | | | S311 | 40 |
| | 14 | (12) | 11 | S312 | 41 |
| 14 | | | | S313 | 42 |
| | | | | S311 | 43 |
| | | (11) | | S312 | 44 |
| 15 | | | | S313 | 45 |
| | | END | | S311 | 46 |

F I G. 9

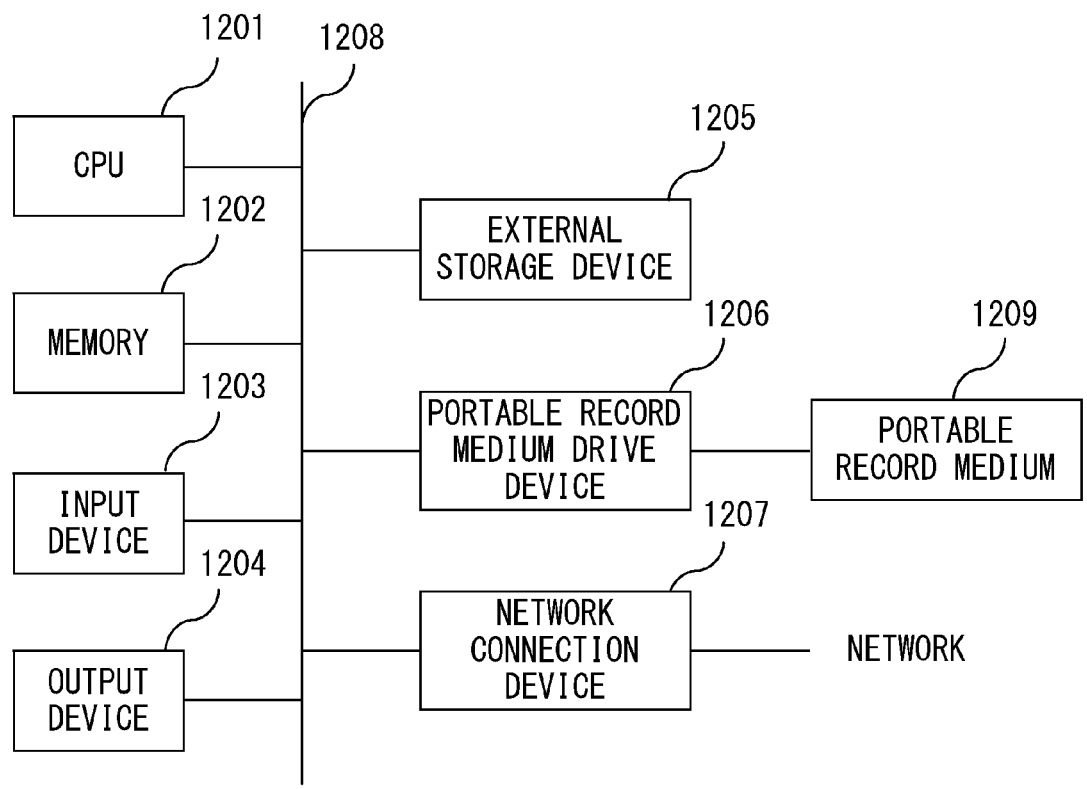
F I G. 1 2

METHOD AND APPARATUS FOR ARITHMETIC OPERATION BY SIMULTANEOUS LINEAR EQUATIONS OF SPARSE SYMMETRIC POSITIVE DEFINITE MATRIX

CROSS-REFERENCE TO RELATED APPLICATIONS

This application is based upon and claims the benefit of priority of the prior Japanese Patent Application No. 2009-068957, filed on Mar. 19, 2009, the entire contents of which are incorporated herein by reference.

FIELD

The technology to be disclosed relates an analysis of a mathematical model by obtaining a solution of simultaneous linear equations of a sparse symmetric positive definite matrix generated by a simultaneously or a mathematical model.

BACKGROUND

A recent scalar computer has the characteristic of high-speed performance of a CPU but the tendency to degrade the performance when memory access becomes locally concentrated. Especially when a solution of simultaneous linear equations of a sparse symmetric positive definite matrix is obtained by performing a Cholesky decomposition (LDL^T decomposition), the reference and update of data often concentrate locally on a memory storage area, thereby possibly failing in improving the efficiency of parallel processing.

Described below is a practical example of the problem.

Assume a sparse symmetric positive definite matrix L as illustrated in FIG. 13. A diagonal element is a node number, "●" indicates a non-zero element, "○" indicates a fill-in generated in the LDL^T (LL^T) decomposition.

The LDL^T decomposition on the basis of a left-looking method can be obtained as described below.

A set of nodes having non-zero elements except i in the i-th row in the matrix L is calculated. The result is referred to as rowstruct(i). For example, rowstruct(4)={1,2,3} and rowstruct(8)={5,7}.

The rowstruct(i) configures a purumed row subtree having a node i of an elimination tree as a root node, and can be calculated therefrom. Practically, {4}+{1,2,3}, and {8}+{5,7} are subtrees. The details of the process is described in the non-patent document 1 below.

Assume that the column vector of L of node i is defined as li, and the diagonal element of the diagonal matrix of the LDL^T decomposition is defined as dii. Additionally, the matrix for performing the LDL^T decomposition is defined as A, and the i-th column vector in the lower triangle matrix is defined as ai.

$$li \leftarrow ai - \Sigma djj \times lij \times lj \quad (1)$$

j ∈ rowstruct(i)

$$li \leftarrow li/dii, \text{ where } dii=lii \quad (2)$$

The li is calculated by repeating the processes indicated by the equations (1) and (2) above from i=1 to n.

If lj is calculated in the node j of the element of the rowstruct(i), the calculation about the j can be performed with respect to the li using them. That is, li=ai is set as a result of the initialization, and the calculation for updating the li can be performed using the lj already calculated at this time point.

The size of the memory storage area required for storing the li can also be calculated using the purumed row subtree of the elimination tree. That is, by counting the number of purumed row subtrees including the node i, the size of the memory storage area can be calculated.

The set of indexes (row number) of a non-zero element of li can be calculated by obtaining the sum of the indexes of the node i and rowstruct (i). The calculating processes can be obtained by analyzing the input array A, and is referred to as a symbolic decomposition. The details are described in the non-patent document 1 below.

According to the information above, the li in each column can be stored in memory after compressing a non-zero element as compressed column storage.

In updating the node i, it is known by the equation (1) above that any index, which is larger than i, of a node as a descendant of the elimination tree is a subset of the index of the node i.

Therefore, the updating calculation of each li can be performed by executing the calculation with compressed data in a temporarily area, searching for an index, and adding the result to the corresponding position of the li.

In performing the parallel calculation of li, the update of the node i is allocated to a thread, and the li can be calculated in parallel using lj that can be referenced. When the update of the node i is completed, the update result can be referenced. Therefore, the thread that has waited for the node can be calculated. The calculation of a node located in the task chain (task queue) and to be next updated is newly assigned to the thread for which the update has been completed. The update about a node j that can be referenced is performed, and a node for which a calculation has not been completed yet is processed later. If the calculation of an available node is completed, and there is a node j required for the calculation, then the completion of the calculation of the node j is awaited. Thus, the calculation of the LDL^T decomposition can be realized in parallel in a pipeline system.

The elimination tree can be calculated from the parentage indicated by the equation below.

$$\text{parent}(i) = \min\{j | lji \neq 0, j > i\} \quad (3)$$

:row number that is a first non-zero number in the i-th column of L

For example, in the matrix illustrated in FIG. 13, the parent of node 1 is node 2, the parent of the node 2 is node 4, the parent of node 3 is a node 4, etc. A practical elimination tree can be calculated by searching the lower triangle ({aij|lj≥j, j=1, . . . , n}) of the array A processed by the LDL^T decomposition. The details of the process are described in the non-patent document 1 below.

FIG. 14 is an example of an elimination tree calculated for the matrix in FIG. 13 by the equation (3) above. For example, the following findings for a parallel calculation can be obtained from the example of the elimination tree.

First, since there is no common node to be referenced between the node 4 and node 7, the nodes 4 and 7 can be independently calculated.

Generally, by the equation (1) above, when {i}+rowstruct (i) and {j}+rowstruct(j) have no common portion, the calculation of li belonging to each of them can be independently performed. In the elimination tree, the subtrees having no common portion can be independently calculated. Since a node required in calculating the li of each node is a purumed subtree having the node i as a root, it is included in the subtree. Therefore, since the subtrees having no common portion do not depend on each other, an independent calculation can be performed.

In FIGS. 13 and 14, the number of non-zero elements including the fill-in in the result of the LDL^T decomposition and the index (row number) of the non-zero element in each column can be obtained by he symbolic decomposition prior to the decomposition as described above.

Each node is numbered in a post order by searching for the elimination tree from the root node (node 21 in FIG. 14) according to the depth first. The meanings of the depth first and the post order are described later in detail when the embodiments are described. In the examples in FIGS. 13 and 14, the post order matches the original number.

The subtree {1,2,3,4} and the subtree {5,6,7} are decomposed by the equations (1) and (2) above. The calculation is performed in the post order from the dependency in the decomposition. That is, the calculation is performed in the order of node 1→2→3→4, and node 5→6→7. The calculations of these two sequences can be performed in parallel.

When the calculations above are completed, calculations are performed in the order of node 8→9→ . . . →21. Since both nodes 8 and 9 refer to the column of 7, the portions updated using the column 7 can be calculated in parallel, and the calculation can be performed if the calculation of the node 7 is completed. Each time a blank thread occurs in 8, 9, and 10, a node is assigned from a task chain, and update of a column is assigned. The calculations of the nodes 11 through 20 have the dependency as in the case above. For example, the column 13 can be calculated, and the nodes 14 and 15 can be updated in parallel. When the update of the node 14 is completed, the node 16 is assigned to the thread. Then, the update of the node 15 and the update of the node 16 are performed in parallel.

Thus, the update can be performed in the pipeline system.

As the conventional technology relating to the technology disclosed by the present application, the following documents of the conventional technology are disclosed.

[Document of Prior Art] T. DAVIS, Direct Methods for Sparse Linear Systems, SIAM 2006

In the above-mentioned conventional parallel calculating system, a memory storage area of a size obtained by adding up the column counts of the columns from 1 to n is assigned as a calculation resultant memory storage area. In this case, the matrix L is stored in the compressed column storage system. The li is stored in the area as a result of adding up 1 through n.

For example, assume that memory is divided into three portions, and a memory storage area is also provided as about three equal portions. Also assume that the memory storage area is simply divided equally into three portions depending on the size of the index i of each li. If the subtree {1,2,3,4} and the subtree {5,6,7} are calculated in parallel, only the first memory storage area (corresponding to i=1~7) is accessed as illustrated in FIG. 13. Then, the nodes 11 through 20 are processed in parallel in the pipeline system in the post order. In this case, only the second (corresponding to i=8~14) and third (corresponding to i=15~21) areas are locally accessed. That is, access is concentrated on a local memory storage area.

When the parallelism is enhanced from 2 to 3, there are less than three subtrees that can be performed in parallel in the examples in FIGS. 13 and 14. Therefore, it is desired to remove the calculation of the subtrees from the target of parallel calculation to maintain balance by reducing the grading of parallel processing. In this case, the calculating process is performed in the post order, and the parallelism in the pipeline process is derived. In this process, a task chain is generated in the post order, and the update process of the li of a node is assigned to each thread as pipeline processing.

However, when the system is adopted, the access to the memory is locally concentrated.

That is, if the parallelism is enhanced in the conventional technology, the performance is to be logically improved in the range of performing a parallel operation in the pipeline. However, since the locality of the access to the memory is intensified, there occurs the problem that there is a strong probability that the calculation efficiency is reduced.

SUMMARY

The technology to be disclosed is realized as a apparatus for performing an arithmetic operation for acquiring a solution of simultaneous linear equations of a sparse symmetric positive definite matrix for each super node configuring an elimination tree obtained by analyzing the structure of a non-zero element of an input matrix prior to a Cholesky decomposition of the positive object matrix, and has the following configuration.

A branch node set detection unit detects a set of branch nodes for each parallel level by searching an elimination tree from a root node.

A subtree memory storage area allocation unit searches a set of branch nodes of the number equal to or exceeding a plurality of memory storage areas as a storage unit to which memory data is assigned by the continuous number of elements of the set in the sets of branch nodes, and allocates the arithmetic result of the column vector for a node group configuring a subtree to a memory storage area selected from a plurality of memory storage areas on the basis of a predetermined selection rule for each subtree having as a root node each branch node included in a set of branch nodes obtained by the search.

A node memory storage area allocation unit allocates an arithmetic result of a column vector for a node group not including a node group configuring each subtree corresponding to a set of branch nodes obtained in the search in a node groups configuring an elimination tree to a memory storage area selected on the basis of a predetermined selecting rule from a plurality of memory storage areas so that arithmetic results of node groups whose parallel levels are close can be allocated to different memory storage areas.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates the configuration according to an embodiment of the present invention;

FIGS. 2A and 2B is a flowchart of the operation of the branch node set detecting process;

FIGS. 3A and 3B is a flowchart of the operation of the memory allocation chain generating process;

FIGS. 4A and 4B is a flowchart of the operation of the task chain generating process;

FIG. 6 is an example of an elimination tree;

FIG. 7 illustrates the configuration (1) of the data according to an embodiment of the present invention;

FIG. 8 illustrates the configuration (2) of the data according to an embodiment of the present invention;

FIG. 9 is an explanatory view of the operation of an embodiment of the present invention;

FIG. 12 is an example (2) of the configuration of the hardware system to which an embodiment of the present invention is applied;

DESCRIPTION OF EMBODIMENTS

Figure 5:
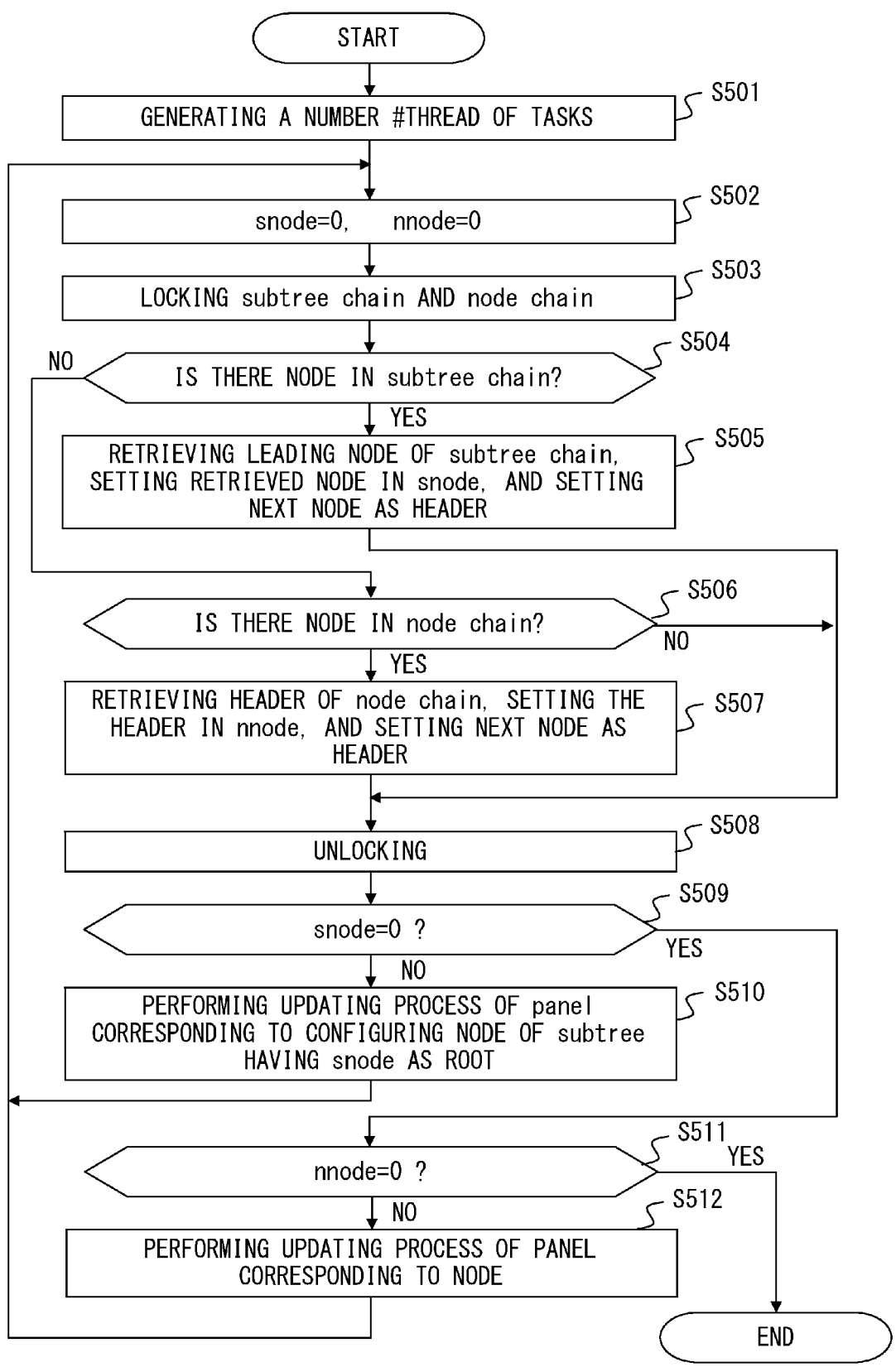
FIG. 5 is a flowchart of the operation of the LDL^T decomposition executing process.

Described below in detail is the embodiments of the present invention.

The LDL^T decomposition of a sparse symmetric positive definite matrix is performed in the following method. First, sparse matrix data is stored in memory in a compressed storage system such as a compressed column storage etc. Thus, non-zero elements in the lower triangle matrix portion including the diagonal elements are compressed and stored in the memory. The dependency among the columns and a non-zero element newly generated in a decomposition are considered, columns having the same or similar non-zero patterns are rearranged and grouped in a panel (block). A block is referred to as a super node, and includes a plurality of nodes. The data dependency among the super nodes generated in the decomposing process is represented by a three structure, and the process is performed. The tree is referred to as an elimination tree.

The node configuring the trees is a super node, and represented by parentage.

When a node is updated in a left-looking method, a row structure referenced by update is determined according to the information about the pruned row subtree of the node. The pruned row subtree is a subtree of an elimination tree.

Therefore, a decomposing calculation can be independently performed in the subtrees having leaves of an elimination tree and having no common portions. The details of the process are described in, for example, the non-patent document 1 above.

When calculations are performed in parallel, it is desired that memory storage areas for storing blocks for super nodes configuring the respective subtrees are allocated close to one another.

When the process is further progressed, a node to be updated is sequentially selected while performing the process in the direction of the root of the tree. As the process approaches the root, there is a decreasing number generally independent subtrees. The updating operations of the blocks of nodes are processed in parallel while considering the dependency of each node. For a sparse matrix, there is a limited number of nodes to be referenced and updated. Therefore, when nodes close to each other configuring tree structures are simply assigned to close memory storage areas in the memory, the referencing and updating operations to the memory are concentrated on a local portion.

To avoid this, the objects of parallel processes are classified into portions dividable by a subtree and portions not dividable by a subtree. Then, by classifying areas storing decomposition results into a plurality of consecutive portions, control is performed so that the storage areas of the block column vector corresponding to the node configuring the subtree can be assigned to different partially continuous areas.

For a node as an element of a portion from which a subtree has been removed, a tree is traced while grouping nodes at the same parallel level until the root of the subtree or a leaf of the tree is reached from the root of the tree. Then, while tracing the inverse route of the traced route above, each node is cyclically allocated to a different partially continuous area.

In the parallel process, a task chain is generated in the system similar to the allocation above. Assuming that the number of threads performing the parallel process is #P, and there are #P or more subtrees, the nodes as the roots of the subtrees are connected to a task chain (subtree chain). For a node from which a subtree has been removed, a tree is traced while grouping nodes at the same parallel level until the root of the subtree or a leaf of the tree is reached from the root of the tree as in allocating a partially continuous area. Then, a chain of nodes in the order of tracing the inverse route of the traced route is generated, thereby obtaining a task chain of nodes (node chain).

In the controlling process above, although the number of threads for performing parallel calculations is changed, the memory access concentration to the same memory storage area can be avoided.

Described below is an elimination tree.

In the present embodiment, an elimination tree is represented by a one-dimensional array parent using the total number of nodes as #node. For example, j=parent (i) represents the meaning that "the parent of node i is node j".

The relationship of a child and a brother in the nodes of the elimination tree is represented by a child and a brother in the one-dimensional array. If the node j is a child of the node i, it is represented by child(i)=j. If the node i has no child, it is represented by child(i)=0.

If there are a plurality of children, one child is represented as a child of the parent, and other children are represented as brothers of the child (not represented as the children of the parent). If j1 and j2 are brothers of the node j, it is represented by brother(j)=j1, brother(j1)=j2, and brother(j2)=0.

A firstdescendant in a node refers to a node having no child, that is, a leaf node, reached by tracing a child (not brothers) from the node. For example, in FIG. 6, the firstdescendant of the node 7 is the node 1, the firstdescendant of the node 6 is the node 4, etc.

A post order is defined as the order in which an elimination tree is searched from the root node 15 in the depth first, and the number is assigned to each node in the searching order. In FIG. 6, the post order is represented by 1, 2, 3, . . . , 14.

The depth first refers to the following searching order. First, a child is traced from the root node, and the deepest node, for example, the node 1, is searched for. By returning by one node to the parent=node 3, a brother of the node 1 in the children of the parent, for example, node 3 is traced. Again, by returning to the parent=node 3 by one node, it is known that there is no more brothers of the node 1 to the child of the parent. Therefore, by further returning to the parent=node 7 from which a child is traced, and the deepest node, for example, the node 4 is searched for. Similarly, the elimination tree is traced, and the post order is determined. Thus, the searching order in which a deeper node is constantly prioritized is referred to as depth first.

The subtree refers to a subset configured by nodes 1 through 7 and a subset configured by nodes 8 through 14. Each of the 3-node subsets figured by the nodes 1 through 3, the nodes 4 through 6, the nodes 8 through 10, the nodes 11 and 12 is also a subtree.

A leaf refers to a node having no child. 1, 2, 4, 5, 6, 9, 11, and 12 are leaves, in FIG. 6.

Using the above-mentioned elimination tree, a super node obtained by grouping column vectors corresponding to a node in a sparse matrix is detected. Only a row having a non-zero element of a node configuring a super node is compressed, and a decomposition result is stored in a two-dimensional panel.

The size of the panel corresponding to each super node is determined by performing a symbolic decomposition on a non-zero pattern of the decomposition result, and it can be known before performing a practical decomposition.

A one-dimensional array storing the total panels is prepared, and it is determined where in the element position of the one-dimensional array a panel corresponding to each super node is to be arranged.

FIG. 1 illustrates the configuration according to an embodiment of the present invention on the basis of the above-mentioned basic concept.

The embodiment includes a branch node set detection unit 101, a memory allocation chain generation unit 102, a task chain generation unit 103, and an LDL^T decomposition execution unit 104.

Branch Node Set Detection Unit 101:

Step 1. Elimination tree data (parent array, child array, brother array) is input. In the elimination tree represented by the data, a search is made from a root node, a set of branch nodes at the same parallel level including a plurality of brother nodes is detected for each level.

Memory Allocation Chain Generation Unit 102:

Step 2. In the set of branch nodes at each level detected in step 1, a set having the number of elements of the set larger than the number of sections (memory storage area) to which memory data is continuously assigned is sequentially searched in the ascending order of level.

Step 3. When it is detected, a branch node is retrieved from the set, the subtree using the node as a root node is retrieved in the post order, and connected to an allocation chain for each memory storage area. In this process, the configuration node of one subtree is connected to the same allocation chain. For each subtree, the allocation chain for specification of a memory storage area to which it is allocated is determined in a cyclical order. As a result, different memory storage areas are allocated through different allocation chains to the subtrees at the same parallel levels during the execution of parallel calculations. That is, during the parallel calculations of the subtrees at the same parallel levels, the access concentration on the same memory storage area by the nodes configuring the respective subtrees can be avoided.

Step 4. The node from which a subtree allocated in step 3 has been removed is searched in the direction of leaves so that the nodes at the same parallel levels can gather from the root node. If the search reaches a branch node or a leaf node allocated in step 3, the search terminates. The searched node is laid on the stack (the work array described later) in the order of search. When the search is completed, a node is retrieved in the inverse order of the searching process while sequentially popping the stack, and an allocation chain is determined in the cyclical order for each node. As a result, different memory storage areas are cyclically allocated through different allocation chains to node groups having levels close to each other and a strong probability that parallel calculations are performed. Thus, during the parallel calculations of nodes, the access concentration on the same memory storage area by the nodes can be avoided.

Task Chain Generation Unit 103

Step 5. In the sets of branch nodes for each level detected in step 1, a set having the number of elements of the set larger than the number of threads performing the parallel process is sequentially searched for in the ascending order of level.

Step 6. The branch nodes included in the set of branch nodes detected in step 5 is sequentially connected to a subtree chain.

Step 7. A node from which each subtree having each branch node processed in step 6 is removed is searched for in the direction of leaf so that nodes at the same parallel levels can gather from the root node. If the search reaches the branch node or the leaf connected to a subtree chain in step 6, then the search terminates. The searched node is laid on the stack (the work array described later) in the order of the search. When the search is completed, a node is retrieved in the inverse order of search while sequentially popping out the stack, and each node is connected to the node chain.

LDL^T Decomposition Execution Unit 104:

Step 8. When there are entries in the subtree chain generated in step 6, each branch node is sequentially retrieved by the number of parallel threads from the head of the subtree chain, and assigned to each thread. In each thread, a left-looking LDL^T decomposition is performed on each node configuring a subtree corresponding to the assigned branch node. When there is no more entries of the subtree chain, each node is retrieved sequentially from the head of the node chain generated in step 7 by the number of parallel threads, and is assigned to each thread. In each thread, the left-looking LDL^T decomposition is performed on the assigned node.

Step 1 performed by the branch node set detection unit 101 corresponds to the branch node set detecting process in the claims of the patent application. Steps 2 and 3 performed by the memory allocation chain generation unit 102 correspond to the subtree memory storage area allocating step or the subtree memory storage area allocation unit in the claims of the patent application. Step 4 performed by the memory allocation chain generation unit 102 corresponds to the node memory storage area allocating step or the node memory storage area allocation unit in the claims of the patent application. Steps 5 and 6 performed by the task chain generation unit 103 correspond to the subtree chain generating step or the subtree chain generation unit in the claims of the patent application. Step 7 performed by the task chain generation unit 103 corresponds to the node chain generating step or the node chain generation unit in the claims of the patent application.

Figure 13:
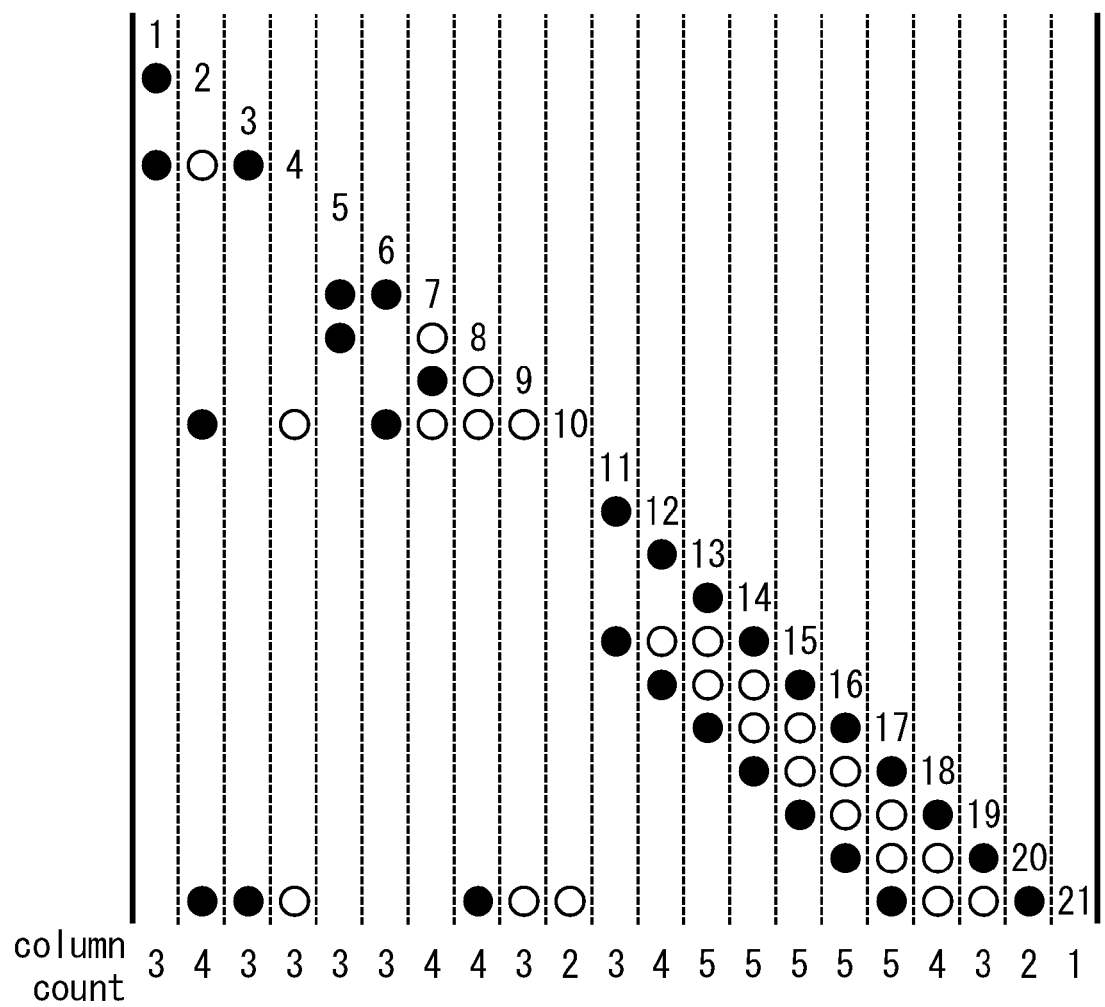
FIG. 13 is an example of a positive object matrix for performing the LDL^T decomposition process.

The detailed process of the present embodiment for realizing the process of each unit is described below with reference to the examples of the matrix illustrated in FIG. 13 and the elimination tree illustrated in FIG. 14 and the flowcharts of the operations illustrated in FIGS. 2 through 5 used in describing the conventional technology technology.

FIGS. 2A and 2B is a flowchart of the operation indicating the details of the branch node set detecting process in step 1 performed by the branch node set detection unit 101.

FIG. 7 illustrates an example of the configuration of the array data for management of a set of branch nodes belonging to each level for each of the levels sequentially increasing from level 1 with the root node of the elimination tree defined as level 1.

FIG. 7 (b) is an example of the data configuration of the one-dimensional array branch in which a branch node is registered in the order of detection from the root node to the leaf node of the elimination tree. In the example, the array element value=21 of the array position 0 of the branch array (704 in FIG. 7 (b)) corresponds to the root node of the elimination tree illustrated in FIG. 14, and indicates the node number of the branch node at the level 1. The array element value=10 of the array position 1 (705 in FIG. 7 (*b*)) corresponds to the node 10 of the elimination tree illustrated in FIG. 14, and indicates the node number of the branch node at the level 2. The array element values=4 and 7 of the array positions 2 and 3 (706 and 707 in FIG. 7 (*b*)) correspond to the nodes 4 and 7 of the elimination tree illustrated in FIG. 14, and indicate each node number of the branch node group at the level 3.

FIG. 7 (*a*) is an example of the data configuration of the one-dimensional array branchlvl storing the leading array position in which the branch node group at each level on the branch array is stored in the order of levels 1, 2, 3, ... from the header as an array element value. In this example, the array element value=0 of the array position 0 (701 in FIG. 7 (*a*)) of the branchlvl array indicates the leading array position storing the branch node group (only the node 21 in FIG. 7 (*b*)) at the level 1 on the branch array in FIG. 7 (*b*). The array element value=1 (702 in FIG. 7 (*a*)) of the array position 1 indicates the leading array position storing the branch node group (only the node 10 in FIG. 7 (*b*)) at the level 2 on the branch array in FIG. 7 (*b*). The array element value=2 (703 in FIG. 7 (*a*)) of the array position 2 indicates the leading array position storing the branch node group (two nodes 4 and 7 in FIG. 7 (*b*)) at the level 3 on the branch array in FIG. 7 (*b*).

The flowchart of the operation in FIGS. 2A and 2B performed by the branch node set detection unit 101 illustrates the process of generating a branchlvl array in FIG. 7 (*a*) and a branch array in FIG. 7 (*b*).

In the following description, it is assumed that each node of the elimination tree in FIG. 14 etc. can be acquired from the above-mentioned parent array input as elimination tree data, a child node for one node can be acquired from the above-mentioned child array, and a brother node can be acquired from the above-mentioned brother array.

In FIGS. 2A and 2B, each of the variables of levelstart, levelend, ptrnext, ptrsearch, and level is initialized (step S201). Leverlstart indicates the leading array position on the branch array of the branch node group belonging to each level when it is searched whether or not there is a further branch node under each branch node belonging to each level. The initial value of levelstart is set to 0 (the head (704 in FIG. 7 (*b*)) of the branch array). Levelend indicates the trailing array position on the branch array of the branch node group belonging to each level when it is searched whether or not there is a further branch node under each branch node belonging to each level. The initial value of levelend is also set to 0. Ptrnext indicates the trailing array position storing a branch node on the branch array. The initial value of ptrnext is also set to 0. Ptrsearch indicates the array position of the branch node in which the search is being performed when it is searched whether or not there is a further branch node under each branch node belonging to each level. Ptrnext has a value from levelstart to levelend, and is set to 0 initially. Level indicates the level at which the process is being performed. The initial value of level is set to 1 (=level of the root node of the elimination tree).

Next, in step S202, the leading array number 0 of the branch array is stored as an index of the level 1 (level=1) at the leading array position 0 of the branchlvl array as illustrated as 701 in FIG. 7 (*a*).

Next, in step S203, it is determined whether or not the expression ptrsearch levelend can hold. First, the determination is YES by holding ptsearch=0 levelend=0. As a result, control is passed to step S204.

In step S204, it is determined whether or not there is a child in the node at the array position=ptrsearch in the branch array. As illustrated in FIG. 14, since there is a child of the node 10 in the node 21 at the array position in the branch array, the determination is YES. As a result, control is passed to step S205.

In step S205, the value of child is set as the childstart variable (childstart=10). The childstart variable indicates the branch node in which a search is being made.

Then, in step S206, it is determined whether or not there are a child and its brother in the child node. Since child=10 has child=4 and its brother=9 in child=10 as illustrated in FIG. 14, the determination is YES. As a result, control is passed to step S207.

In step S207, the value of the ptrnext variable is incremented by 1 (ptrnext=0+1=1).

Then, in step S208, the value of the ptrnext variable is stored as an index of a level (level+1) in the array position corresponding to the value of the level variable of the branchlvl array. If a value has already been stored in the array position, the process is not performed. As illustrated as 702 in FIG. 7 (*a*), ptrnext=1 is stored as an index of the level 2 (=level+1) in the array position 1 (level=1) of the branchlvl array.

Next, in step S209, the node number of child is stored in the array position corresponding to the value of ptrnext of the branch array. In this example, child=10 is stored in the array position 1 of branch as illustrated by 705 in FIG. (*b*).

Then, in step S212, it is determined whether or not there is a brother in the node indicated by the childstart variable. Since childstart=10 has brother=20 as illustrated in FIG. 14, the determination is YES. As a result, control is passed to step S213.

In step S213, the value of the childstart variable and the value of child are replaced with the node values of the brother of the node indicated by the childstart variable (childstart=20, child=20). Then, control is passed to step S206.

Figure 14:
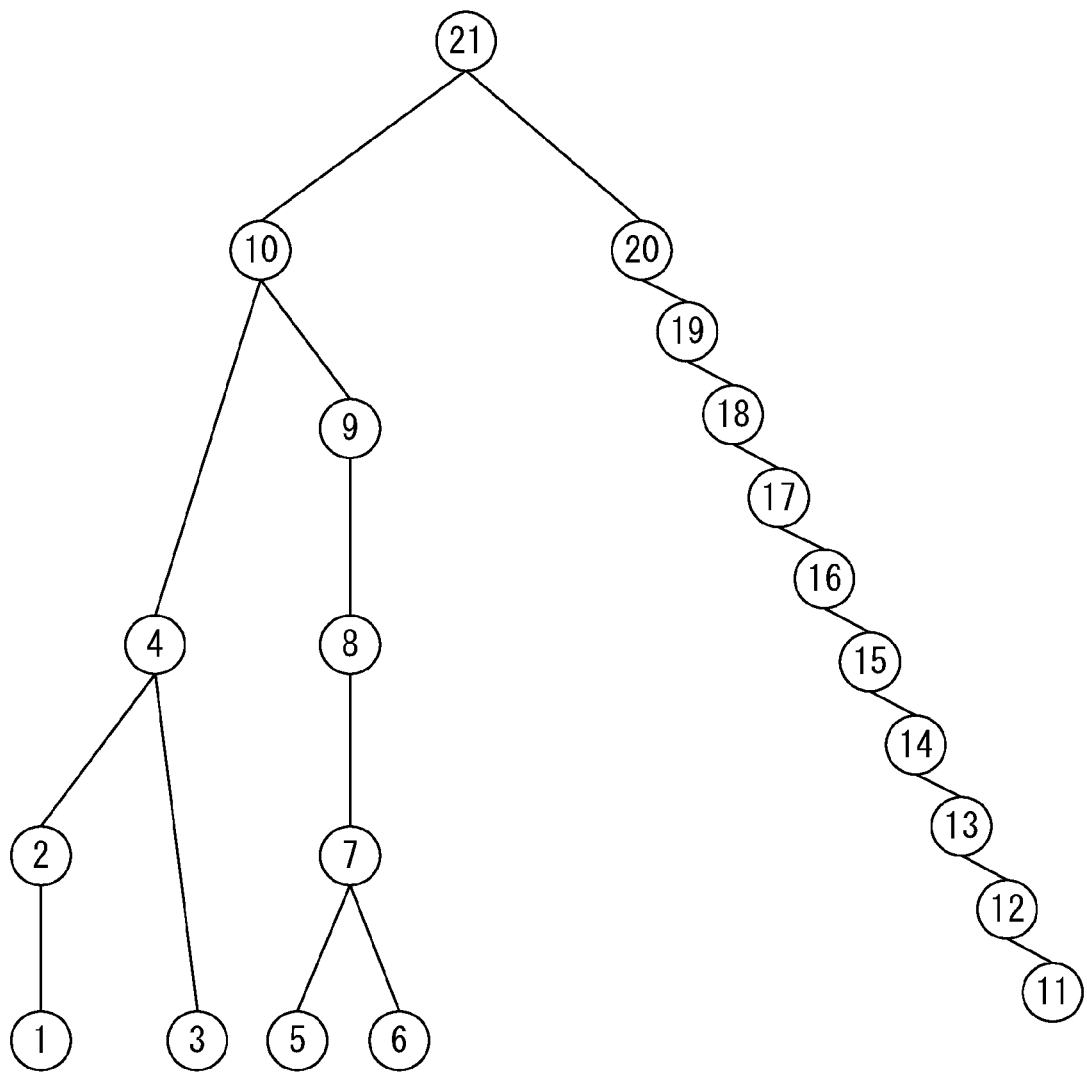
FIG. 14 illustrates an elimination tree corresponding to an embodiment of the positive object matrix illustrated in FIG. 12.

As illustrated in FIG. 14, child=20 has child=19 as a child, but has no brother. Therefore, the determination in step S207 is NO. As a result, control is passed to step S210.

As described above, since child=20 has child=19, the determination in step S210 is YES. As a result, control is passed to step S211.

In step S211, the child of the child replaces child (child=19). Then, control is passed to step S206.

By repeating the processes in steps S206→S210→S211→S206, the node of the child is changed in the order of 19→18→17→16→15→14→13→12→11 as illustrated in FIG. 14.

When child=11 is set, and the process in step S206 is performed, there is no child under child=11 as illustrated in FIG. 14, the determination in step S206 is NO. As a result, control is passed to step S210.

Since there is no child under child=11 as described above, the determination in step S210 is NO. As a result, control is passed to step S212.

Since childstart=20 has no brother as illustrated in FIG. 14, the determination in step 212 is NO. As a result, control is passed to step S214.

In step S214, the value of the ptrsearch variable is incremented by 1 (ptrsearch=0+1=1). Then, control is passed to step S203.

As indicated by 704 in FIG. 7 (*b*), there is only one branch node (=node 21) at level 1 (ptrsearch=1>levelend=0). Therefore, the determination in step S203 is NO. As a result, control is passed to step S215.

In step S215, the updating process for level 2 is performed. That is, the leading array position levelstart at level 2 is the array position after (+1) the trailing array position levelend at level 1. The trailing array position levelend at level 2 is the current trailing array position ptrnext of the branch array. As the value of the variable len, len=levelend−levelstart+1 is calculated. Additionally, the variable level value indicating the current level is incremented.

In step S216, it is determined whether or not the value of variable len is larger than 0. If a branch node group is detected at the preceding level, the ptrnext value is incremented, and therefore the levelend value is also incremented, indicating the value of the variable len larger than 0. As a result, the determination in step S216 is YES, control is passed to step S203, and a search is further continued on the branch node group detected at the preceding level. If the branch node group has not been detected at the preceding level, the determination in step S216 is NO, thereby terminating all processes.

In step S215, levelstart=0+1=1, levelend=ptrnext=1, len=1−1+1=1, and level=1+1=2. As a result, len=1>0, and the determination in step S216 is YES. Then, control is passed to step S203.

Since ptrsearch=1≤levelend=1, the determination in step S203 is YES. As a result, control is passed to step S204.

Since the node 10 (705 in FIG. 7 (b)) in the array position=ptrsearch=1 in the branch contains child=4 as illustrated in FIG. 14, the determination in step S204 is YES. As a result, control is passed to step S205.

In step S205, childstart=4 is set.

Then, as illustrated in FIG. 14, since child=4 has further child=2 and its brother=3, the determination in step S206 is YES. As a result, control is passed to step S207.

In step S207, ptrnext=1+1=2 is set.

Then, in step S208, as illustrated by 703 in FIG. 7 (a), the trailing array position ptrnext=2 of the branch array is stored as an index at level 3 (=level+1) in the array position level=2 of the branchlvl array.

Then, in step S209, child=4 is stored in the trailing p array position ptrnext=2 of the branch array. Then, control is passed to step S212.

As illustrated in FIG. 14, since childstart=4 includes brother=9, the determination in step S212 is YES. As a result, control is passed to step S213.

In step S213, childstart=9 and child=9 are set. Then, control is passed to step S206.

As illustrated in FIG. 14, child=9 has child=8, but has no brother. Therefore, the determination in step S206 is NO. As a result, control is passed to step S210.

As described above, since child=9 has child=8, the determination in step S210 is YES. As a result, control is passed to step S211.

In step S211, child=8 is set. Then, control is passed to step S206.

As illustrated in FIG. 14, child=8 has child=7, but has no brother. Therefore, the determination in step S206 is NO. As a result, control is passed to step S210.

As described above, since child=8 has child=7, the determination in step S210 is YES. As a result, control is passed to step S211.

In step S211, child=7 is set. Then, control is passed to step S206.

As illustrated in FIG. 14, child=7 further has child=5 and brother=6. Therefore, the determination in step S206 is YES. As a result, control is passed to step S207.

In step S207, the trailing array position of the branch array is ptrnext=2+1=3.

Since the index=2 at the level 3 (=level+1) is already placed in the array position 2 (=level) of the branchlvl array, the process in step S208 is not performed.

Then, in step S209, child=7 is stored at the trailing array position ptrnext=3 of the branch array. Then, control is passed to step S212.

As illustrated in FIG. 14, since childstart=9 has no brother, the determination in step S212 is NO. As a result, control is passed to step S214.

In step S214, ptrsearch=1+1=2 is set. Then, control is passed to step S203.

As indicated by 705 in FIG. 7 (b), the branch node at the level 2 is only one (=node 10), and ptrsearch=2>levelend=1. Therefore, the determination in step S203 is NO. As a result, control is passed to step S215.

In step S215, levelstart=1+1=2, levelend=ptrnext=3, len=3−2+1=2, and level=2+1=3 are set. As a result, len=2>0 is derived, and the determination in step S216 is YES. Then, control is passed to step S203.

Since ptrsearch=2 levelend=3 is set, the determination in step S203 is YES. As a result, control is passed to step S204.

As illustrated in FIG. 14, since the node 4 of the array position ptrsearch=2 in the branch array has child=2, the determination in step S204 is YES. As a result, control is passed to step S205.

In step S205, childstart=2 is set.

As illustrated in FIG. 14, child=2 has child=1, but has no brother. Therefore, the determination in step S206 is NO. As a result, control is passed to step S210.

As described above, since child=2 has child=1, the determination in step S210 is YES. As a result, control is passed to step S211.

In step S211, child=1 is set. Then, control is passed to step S206.

As illustrated in FIG. 14, child=1 is a leaf node, but not a child. Therefore, the determination in step S206 is NO. As a result, control is passed to step S210.

As described above, since child=1 has no child, the determination in step S210 is NO. As a result, control is passed to step S212.

As illustrated in FIG. 14, since childstart=2 has brother=3, the determination in step S212 is YES. As a result, control is passed to step S213.

In step S213, childstart=3 and child=3 are set. Then, control is passed to step S206.

As illustrated in FIG. 14, since child=3 is a leaf node, but not a child. Therefore, the determination in step S206 is NO. As a result, control is passed to step S212.

As illustrated in FIG. 14, since childstart=3 has no brother, the determination in step S212 is NO. As a result, control is passed to step S214.

In step S214, ptrsearch=2+1=3 is set. Then, control is passed to step S203.

As illustrated as 706 and 707 in FIG. 7 (b), there are two branch nodes (=nodes 4 and 7) at the level 3, the process of the node 4 has been terminated and control has been passed to the process of the node 7, and ptrsearch=3 levelend=3 is set. Therefore, the determination in step S203 is YES. As a result, control is passed to step S204.

As illustrated in FIG. 14, since the node 7 at the array position ptrsearch=3 in the branch has child=5, the determination in step S204 is YES. As a result, control is passed to step S205.

In step S205, childstart=5 is set.

Then, as illustrated in FIG. 14, child=5 is a leaf node, and has no child. Therefore, the determination in step S206 is NO. As a result, control is passed to step S212.

As illustrated in FIG. 14, childstart=5 has brother=6. Therefore, the determination in step S212 is YES. As a result, control is passed to step S213.

In step S213, childstart=6 and child=6 are set. Then, control is passed to step S206.

As illustrated in FIG. 14, child=6 is a leaf node and has no child. Therefore, the determination in step S206 is NO. As a result, control is passed to step S212.

As illustrated in FIG. 14, childstart=6 has no brother. Therefore, the determination in step S212 is NO. As a result, control is passed to step S214.

In step S214, ptrsearch=3+1=4 is set. Then, control is passed to step S203.

As indicated by 706 and 707 in FIG. 7 (b), there are two branch nodes at the level 3, the processes of the nodes 4 and 7 have been completed, and ptrsearch=4>levelend=3. Therefore, the determination in step S203 is NO. As a result, control is passed to step S215.

In step S215, levelstart=3+1=4, levelend=ptrnext=3, len=3−4+1=0, and level=3+1=4 are set. As a result, len=0=0 is set, and the determination in step S216 is NO, thereby terminating all processes.

As described above, an elimination tree is analyzed, and the branchlvl array exemplified in FIG. 7 (a) and the branch array exemplified in FIG. 7 (b) are generated.

Next, FIGS. 3A and 3B is a flowchart of the operation illustrating the details of the memory allocation chain generating process insteps 2 through 4 performed by the memory allocation chain generation unit 102 illustrated in FIG. 1. In this example, a memory storage area is allocated to each node of an elimination tree.

First, as an example, assume that an area storing a result of the process of a parallel calculation is divided into two memory storage areas. If a node configuring an elimination tree as illustrated in FIG. 14 is allocated to two memory storage areas, for example, the data configuration as illustrated in FIG. 8 can be adopted.

First, as exemplified in FIG. 8 (a), a one-dimensional node array 800 whose array position uniquely corresponds to each node configuring the elimination tree is prepared. For example, the array position 0 corresponds to the node 21 in FIG. 14, the array position 1 corresponds to the node 10 in FIG. 14, the array position 2 corresponds to the node 4 in FIG. 14, and so on. The node group executed in the memory storage area1 is allocated to the allocation chain 1 in the execution order. First in this case, as illustrated in FIG. 8 (a), a register 801 indicating the head of the allocation chain 1 is prepared, and the register 801 stores the array position on the one-dimensional node array 800 corresponding to the first node executed in the memory storage area 1. Next, the array position on the one-dimensional node array 800 referenced from the register 801 stores the array position of the one-dimensional node array 800 corresponding to the node executed second. Similarly stored is the array position corresponding to the node executed after the node corresponding to each array position on the one-dimensional node array 800. The array position of the finally executed node stores null data. Thus, the nodes executed in the memory storage area 1 and their execution order are set by sequentially tracing the array positions on the one-dimensional node array 800 from the register 801 as the allocation chain 1. As with the case of the allocation chain 1, the node group executed in the memory storage area 2 is also allocated to the allocation chain 2 in the execution order. First in this case, as illustrated in FIG. 8 (a), a register 802 indicating the head of the allocation chain 2 is prepared, and the register 802 stores the array position on the one-dimensional node array 800 corresponding to the first node executed in the memory storage area 2. Next, the array position on the one-dimensional node array 800 referenced from the register 802 stores the array position of the one-dimensional node array 800 corresponding to the node executed second. Similarly stored is the array position corresponding to the node executed after the node corresponding to each array position on the one-dimensional node array 800. The array position of the finally executed node stores null data.

In the description below, the section (memory storage area) to which memory data is continuously allocated is referred to as a pool, and the number of pools is expressed by #pool. That is, in the assumption, #pool=2 is set.

In the flowchart of the operation in FIGS. 3A and 3B, a branch node set having the number of elements equal to or exceeding #pool can be first detected by accessing the branchlvl array illustrated in FIG. 7 (a) and the branch array illustrated in FIG. 7 (b) (step S301). The branchlvl array and the branch array are acquired by the branch node set detecting process illustrated in the flowchart of the operation in FIGS. 2A and 2B. From the example of the array structure illustrated in FIG. 7, the branch node set at the level 1 is {21} (a set having the node 21 as an element). Next, the branch node set at the level 2 is {10} (a set having the node 10 as an element). Furthermore, the branch node set at the level 3 is {4,7} (a set having the nodes 4 and 7). If #pool=2, a branch node set having the number of elements equal to or exceeding 2 is a branch node set {4,7} at the level 3. As a result, the determination in step S302 is YES.

By the processes in steps S301 and S302, the process in step 2 by the memory allocation chain generation unit 102 is realized.

Next, one node (branch node) is retrieved as nodelvl from the level set detected in step S301 (step S303). In this process, for example, the node 4 is retrieved as nodelvl from the set {4,7} at the level 3.

Next, the branch node instructing one-dimensional array nmark as exemplified in FIG. 8 (b) is prepared. The one-dimensional array nmark in FIG. 8 (b) has the same number of array elements as the one-dimensional node array 800 in FIG. 8 (a), and the same array position in FIG. 8 (a) corresponds to the same node. When a node at each array position is a branch node, a value indicating "on" is set in the array position on the branch node instructing one-dimensional array nmark corresponding to the branch node. In the branch node instructing one-dimensional array nmark, the array element of the array position corresponding to the node nodelvl=4 retrieved in step S303 is set to the value indicating "on" (step S304). Each array element of the nmark array is completely cleared in the initial state.

Next, the node of firstdescendant corresponding to the node nodelvl is set to a fstdecs variable (step S305). In the example in FIG. 14, the node of firstdescendant corresponding to the node 4 is the node 1, that is, fstdecs=1.

Then, the component nodes of the current subtree are connected to the allocation chain (chain 1 or chain 2) of the currently selected pool in the post order from the fstdecs node to the nodelvl node (step S306). For example, assume that pool 1 is selected, and the allocation chain is chin 1. The post order from fstdecs=1 to nodelvl=4 is node 1→node 2→node 3→node 4 as illustrated in FIG. 14. Therefore, the allocation chain 1 is expressed as follows.

$$\text{chain } 1 = \{1 \rightarrow 2 \rightarrow 3 \rightarrow 4\} \quad (4)$$

The allocation chain 1 is formed using the data structure illustrated in FIG. 8 (a).

Next, the currently selected pool is cyclically changed by the following equation (step S307). A pool is a variable indicating the currently selected pool number. In addition, mod (A,B) indicates the operation of obtaining a remainder after dividing A by B.

$$pool=mod(pool, \#pool)+1 \qquad (5)$$

Assuming that #pool=2, and the current pool number is pool=1, a new pool number as a result of the calculation above is pool=2. On the other hand, if the current pool number is pool=2, a new pool number as a result of the calculation above is pool=1.

After the current pool is changed from 1 to 2, it is determined whether or not there is a remainder of the level set detected in step S301 (step S308).

In the case of the set {4,7} at the level 3, the node 7 still remains. Therefore, the determination in step S308 is YES, and control is returned to step S303. As a result, the node 7 is retrieved from the set {4,7} at the level 3 (step S303). Next, the array element of the array position corresponding to the above-mentioned node nodelvl=7 on the one-dimensional array nmark is set to the value indicating "on" (step S304). Furthermore, fstdecs=5 is set as the node of firstdescendant corresponding to the nodelvl node=4 (step S305). (refer to FIG. 14). Then, the component nodes of the current subtree, that is, node 5→node 6→node 7, are sequentially connected in the post order from fstdecs=5 to nodelvl=7 to the currently selected allocation chain=chain 2 of pool=2 (step S306). Therefore, the allocation chain 2 is expressed as follows.

$$chain\ 2=\{5,6,7\} \qquad (6)$$

By the processes above in steps S303 through S308, the above-mentioned process in step 3 is realized by the memory allocation chain generation unit 102.

Next, each node is sequentially traced from the root node of the elimination tree until the branch node or the leaf node whose array element of the branch node instructing one-dimensional array nmark is "on" is reached. In this example, a one-dimensional work array illustrated in FIG. 8 (*c*) is prepared, a node at the same parallel level is traced from the root, and the traced node is sequentially stored in the work array. The process is realized by the processes from steps S309 through S313 in FIGS. 3A and 3B. These processes are described with reference to the explanatory views of the operations in FIG. 9.

First, in step S309, unless the root node is "on" on the branch node instructing one-dimensional array nmark, it is stored in the work array. If it is stored, nodeend=1 is set. If it is not stored, nodeend=0 is set. Normally, since the root node is not "on" on the nmark, nodeend=1 is set (row 1 in FIG. 9). When nodeend=0 is set, it is a special case. The "nodeend" indicates the trailing storage position of the work array. The "nodestart" indicates the search position of an object node.

Next, in step S310, nodestart=1 is set (row 2 in FIG. 9). The leading array position of the work array is 1.

Next, in step S311, it is determined whether or not nodestart≤nodeend holds. In the state in the row 3 in FIG. 9, the determination in step S311 is YES, and control is passed to step S312.

In step S312, the node indicated by nodestart is retrieved from the work array, and the nodes of the child and brother of the node (hereinafter referred to as an "object node") are checked. If the checked node is not "on" on the nmark array, nodeend=nodeend+1 is set, and the checked node is stored in the array position on the work array indicated by nodeend. In the state in the row 4 in FIG. 9, the node 21 in the array position indicated by nodestart=1 is retrieved from the work array, and the nodes of the child and brother of the node 21 are checked. The node 21 is set in the array position 1 of the work array in the row 1 in FIG. 9. In the example in FIG. 14, each of the node 10 as a child node of the node 21 and the node 20 as its brother node is checked. First, the node 10 is not an object of memory allocation in the processes in steps S301 through S308, and is not "on" on the nmark array. Therefore, the node 10 is stored in the array position 2 on the work array indicated by nodeend=1+1=2 (low 4 in FIG. 9). Then, the node 20 is not an object of memory allocation in the processes in steps S301 through S308, and is not "on" on the nmark array. Therefore, the node 20 is stored in the array position 3 on the work array indicated by nodeend=2+1=3 (row 5 in FIG. 9).

If the search of nodes of all children and brothers of object nodes have been completed, nodestart=nodestart+1 is set in step S313. In the state in the row 6 in FIG. 9, nodestart=1+1=2 is set. Then, control is passed to step S311.

In the state in the row 7 in FIG. 9, nodestart=2 nodeend=3 is set and the determination in step S311 is YES, and control is passed to step S312.

In step S312, in the state in the row 8 in FIG. 9, an object node 10 in the array position indicated by nodestart=2 is retrieved from the work array, and the nodes of the child and brother of the object node 10 are checked. The object node 10 is set in the array position 2 of the work array in the row 4 in FIG. 9. In the example in FIG. 14, each node of the node 4 as a child node and the node 9 as a brother node of the object node 10 is checked. First, the node 4 is an object of memory allocation in the processes in steps S301 through S308, and is "on" on the nmark array. Therefore, the node 4 is not stored in the work array. Then, the node 9 is not an object of memory allocation in the processes in steps S301 through S308, and is not "on" on the nmark array. Therefore, the node 9 is stored in the array position 4 on the work array indicated by nodeend=3+1=4 (low 8 in FIG. 9).

In the state in the row 9 in FIG. 9, nodestart=2+1=3 is set in FIG. S313. Then, control is passed to step S311.

In the state in the row 10 in FIG. 9, nodestart=3 nodeend=4 is set and the determination in step S311 is YES, and control is passed to step S312.

In step S312, in the state in the row 11 in FIG. 9, an object node 20 in the array position indicated by nodestart=3 is retrieved from the work array, and the nodes of the child and brother of the object node 20 are checked. The object node 20 is set in the array position 3 of the work array in the row 5 in FIG. 9. In the example in FIG. 14, the node 19 as a child node of the object node 20 is checked. That is, the node 19 is not an object of memory allocation in the processes in steps S301 through S308, and is not "on" on the nmark array. Therefore, the node 19 is stored in the array position 5 on the work array indicated by nodeend=4+1=5 (low 11 in FIG. 9).

In the state in the row 12 in FIG. 9, nodestart=3+1=4 is set in FIG. S313. Then, control is passed to step S311.

In the state in the row 13 in FIG. 9, nodestart=4 nodeend=5 is set and the determination in step S311 is YES, and control is passed to step S312.

In step S312, in the state in the row 14 in FIG. 9, an object node 9 in the array position indicated by nodestart=4 is retrieved from the work array, and the nodes of the child and brother of the object node 9 are checked. The object node 9 is set in the array position 4 of the work array in the row 8 in FIG. 9. In the example in FIG. 14, the node 8 as a child node of the object node 9 is checked. That is, the node 8 is not an object of memory allocation in the processes in steps S301 through S308, and is not "on" on the nmark array. Therefore, the node 8 is stored in the array position 6 on the work array indicated by nodeend=5+1=6 (low 14 in FIG. 9).

In the state in the row 15 in FIG. 9, nodestart=4+1=5 is set in FIG. S313. Then, control is passed to step S311.

In the state in the row 16 in FIG. 9, nodestart=5≤nodeend=6 is set and the determination in step S311 is YES, and control is passed to step S312.

In step S312, in the state in the row 17 in FIG. 9, an object node 19 in the array position indicated by nodestart=5 is retrieved from the work array, and the nodes of the child and brother of the object node 19 are checked. The object node 19 is set in the array position 5 of the work array in the row 11 in FIG. 9. In the example in FIG. 14, the node 18 as a child node of the object node 19 is checked. That is, the node 18 is not an object of memory allocation in the processes in steps S301 through S308, and is not "on" on the nmark array. Therefore, the node 18 is stored in the array position 7 on the work array indicated by nodeend=6+1=7 (low 17 in FIG. 9).

In the state in the row 18 in FIG. 9, nodestart=5+1=6 is set in FIG. S313. Then, control is passed to step S311.

In the state in the row 19 in FIG. 9, nodestart=6 nodeend=7 is set and the determination in step S311 is YES, and control is passed to step S312.

In step S312, in the state in the row 20 in FIG. 9, an object node 8 in the array position indicated by nodestart=6 is retrieved from the work array, and the nodes of the child and brother of the object node 8 are checked. The object node 8 is set in the array position 6 of the work array in the row 14 in FIG. 9. In the example in FIG. 14, the node 7 as a child node of the object node 8 is checked. That is, the node 7 is an object of memory allocation in the processes in steps S301 through S308, and is "on" on the nmark array. Therefore, the node 7 is not stored in the work array (low 20 in FIG. 9).

In the state in the row 21 in FIG. 9, nodestart=6+1=7 is set in FIG. S313. Then, control is passed to step S311.

In the state in the row 22 in FIG. 9, nodestart=7=nodeend=7 is set and the determination in step S311 is YES, and control is passed to step S312.

In step S312, in the state in the row 23 in FIG. 9, an object node 18 in the array position indicated by nodestart=7 is retrieved from the work array, and the nodes of the child and brother of the object node 18 are checked. The object node 18 is set in the array position 7 of the work array in the row 17 in FIG. 9. In the example in FIG. 14, the node 17 as a child node of the object node 18 is checked. That is, the node 17 is not an object of memory allocation in the processes in steps S301 through S308, and is not "on" on the nmark array. Therefore, the node 17 is stored in the array position 8 on the work array indicated by nodeend=7+1=8 (low 23 in FIG. 9).

Similar processes are performed in the subsequent steps, and the nodes 16 through 11 are sequentially stored in the array positions 9 through 14 on the work array (rows 24 through 41 in FIG. 9).

In the state in the row 42 in FIG. 9, nodestart=13+1=14 is set in FIG. S313. Then, control is passed to step S311.

In the state in the row 43 in FIG. 9, nodestart=14=nodeend=14 is set and the determination in step S311 is YES, and control is passed to step S312.

In step S312, in the state in the row 44 in FIG. 9, an object node 11 in the array position indicated by nodestart=14 is retrieved from the work array, but there is no child or brother node in the object node 11 as illustrated in FIG. 14. Therefore, no node is stored in the work array (row 44 in FIG. 9). The object node 11 is set in the array position 14 on the work array in the row 41 in FIG. 9.

In the state in the row 45 in FIG. 9, nodestart=14+1=15 is set in FIG. S313. Then, control is passed to step S311.

In the state in the row 46 in FIG. 9, nodestart=15=nodeend=14 is set and the determination in step S311 is NO, the determination in step S311 is NO, thereby passing control to step S314.

By the processes in steps S309 through S313 in FIGS. 3A and 3B described above, a result of sequentially tracing each node from the root node of the elimination tree until the branch node or the leaf node in the "on" position on the nmark array is reached is acquired on the work array. In the example in FIG. 8 corresponding to FIG. 14, the result obtained on the work array is expressed as follows.

$$\text{work}=\{21|10,20|9,19|8,18|17|16|15|14|13|12|11\} \quad (7)$$

where the limiting mark "|" indicates the boundary between levels.

As described above, when the work array is determined, a node of each work array element work(n) is sequentially retrieved in the inverse order of tracing by decreasing 1 from n=nodeend to 1 in step S314. Then, the node sequentially retrieved from the work array is cyclically added alternately to the ends of the allocation chains 1 and 2 acquired by the equations (4) and (6) above. As a result, the allocation chains 1 and 2 are expressed as follows.

$$\text{chain 1}=\{1\to2\to3\to4\to11\to13\to15\to17\to8\to9\to10\} \quad (8)$$

$$\text{chain 2}=\{5\to6\to7\to12\to14\to16\to18\to19\to20\to21\} \quad (9)$$

By the processes above, the memory allocation and processing order of nodes are determined. Finally, in step S315, the allocation chain 1 or 2 for each pool is retrieved in the order of pool number, a node is retrieved by tracing each allocation chain, and a memory storage area is allocated to each node in order.

As described above, the size of the column vector li of the node i in the sparse symmetric positive definite matrix L can be obtained by the analysis referred to as a symbolic decomposition. A calculation result of the LDL^T decomposition of each node is stored in the memory storage area corresponding to the allocation chain in which each node is registered. That is, a process result of each node connected to the chain 1 is allocated to the first half of the memory storage area and stored therein in the order of connection of each node in the allocation chain. Similarly, the process result of each node connected to the chain 2 is allocated to the second half of the memory storage area and stored therein in the order of connection of each node in the allocation chain.

Figure 10:
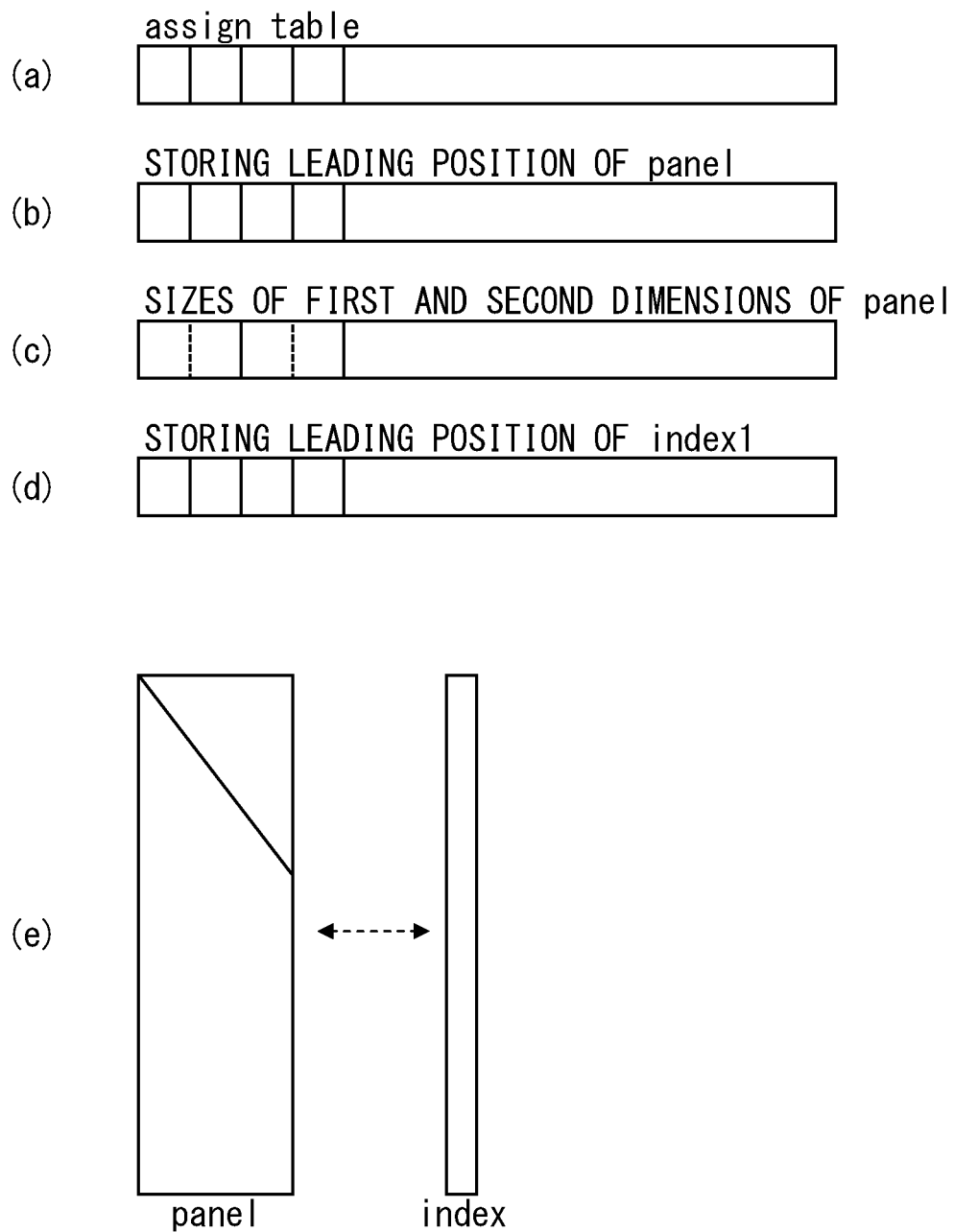
FIG. 10 illustrates the configuration (3) of the data according to an embodiment of the present invention.

The correspondence table of the order of node allocation to each memory storage area on the basis of the allocation chains 1 and 2 is stored in the assign table having an example of a data configuration illustrated in FIG. 10 (*a*).

In addition, as in the case of the compressed column storage, the position of the head of the panel (area storing the column) corresponding to the node having a relative allocation order is m in the memory storage area is calculated, and the value indicating the head position is stored in, for example, the one-dimensional array illustrated in FIG. 10 (*b*).

Practically, a result of the LDL^ T decomposition of a node is stored in the panel of a two-dimensional array after compressing only a row including a non-zero element. Therefore, a one-dimensional array illustrated in FIG. 10 (*c*) for storing a pair of the size of the first dimension and the size of the second dimension for each panel is prepared.

Furthermore, a one-dimensional array illustrated in, for example, FIG. 10 (*d*) storing the value indicating the head position of an index for specifying the row including a non-zero element is prepared (refer to FIG. 10 (*e*)).

In step S315, data is set on the basis of the allocation chains 1 and 2 on the data group for memory allocation control as illustrated in FIG. 10. When an LDL^T decomposing process described later is performed, the control of allocating a calculation result of each node to the memory storage area by appropriately referring to the data group is executed.

Next, FIGS. 4A and 4B is a flowchart of the operations indicating the details of the operations performed in steps 5 through 7 performed by the task chain generation unit 103 in FIG. 1. In this example, each node on an elimination tree is registered in a task chain for control of a parallel calculation using threads.

A task chain includes a subtree chain and a node chain. As an example of a data structure of a task chain, the data structure as illustrated in FIG. 8 (a) can be adopted as in the case of the allocation chain in the memory allocation chain generating process. In addition, as an example of the data structure of the branch node instructing one-dimensional array nmark and the work array used in the following process, the data structure as illustrated in FIGS. 8B and 8C can be adopted as in the case of the memory allocation chain generating process.

In the following description, an example of the case in which the number of threads being executed in parallel is 2 is described. The number of threads is expressed by #thread.

In the operation flowchart illustrated in FIGS. 4A and 4B, a branch node set having the number of elements equal to or exceeding #thread is detected by accessing the branchlvl array illustrated in FIG. 7 (a) and the branch array illustrated in FIG. 7 (b) (step S401). In this example, the branchlvl array and the branch array are acquired by the branch node set detecting process illustrated in the operation flowchart in FIGS. 2A and 2B. From the example of the array structure illustrated in FIG. 7, the branch node set at the level 1 is expressed by {21} (set having the node 21 as an element). Next, the branch node set at the level 2 is expressed by {10} (set having the node 10 as an element). Furthermore, the branch node set at the level 3 is expressed by {4,7} (set of the nodes 4 and 7). If #thread=2 is set, the branch node set having the number of elements of 2 or more is expressed by a branch node set {4,7} at the level 3. As a result, the determination in step S402 is YES.

By the processes in steps S401 and S402, the process by the task chain generation unit 103 in the step 5 above is realized.

Next, from the level set detected in step S401, one node=branch node is retrieved, and set as nodelvl (step S403). For example, the node 4 is retrieved as nodelvl from the set {4,7} of level 3.

Next, the branch node instructing one-dimensional array nmark as exemplified in FIG. 8 (b) is prepared. The one-dimensional array nmark illustrated in 8B has the same number of array elements as the one-dimensional node array 800 illustrated in FIG. 8 (a), and the same array position in FIG. 8 (a) corresponds to the same node. When the node at each array position is a branch node, the value indicating "on" in the array position on the branch node instructing one-dimensional array nmark corresponding to the branch node is set. In the branch node instructing one-dimensional array nmark, the array element in the array position corresponding to the node nodelvl=4 retrieved in step S403 is set to the value indicating "on" (step S404). Each array element of the nmark array is all cleared in the initial state.

Next, the node of firstdescendant corresponding to the node nodelvl is set to the fstdecs variable (step S405). In the example illustrated in FIG. 14, the node of first descendant corresponding to the node 4 is the node 1, that is, fstdecs=1.

Then, the node nodelvl is added to the first task chain referred to as a subtree chain (step S406). That is, the subtree chain is expressed as follows.

$$\text{subtree chain} = \{4\} \tag{10}$$

The subtree chain is formed using the data structure illustrated in FIG. 8 (a).

Next, it is determined whether or not there is a remainder of the level set detected in step S401 (step S407).

In the case of the set {4,7} at the level 3 above, the node 7 still remains. Therefore, the determination in step S407 is YES, and control is returned to step S403. As a result, the node 7 is retrieved from the set {4,7} at the level 3 (step S403). Next, the array element of the array position corresponding to the node nodelvl=7 on the one-dimensional array nmark is set to the value indicating "on" (step S404). Furthermore, as a node of first descendant corresponding to the nodelvl node=4, fstdecs=5 is set (step S405) (refer to FIG. 14). Then, the node nodelvl is added to the subtree chain (step S406). Therefore, the subtree chain is expressed as follows.

$$\text{subtree chain} = \{4 \rightarrow 7\} \tag{11}$$

By the processes in steps S403 through S407 above, the process performed by the task chain generation unit 103 in the step 6 above is realized.

Next, each node is traced sequentially from the root node of an elimination tree until a branch node or a leaf node whose array element of the branch node instructing one-dimensional array nmark is "on" is reached. In this example, as in the case of the memory allocation chain generating process illustrated in the operation flowchart in FIGS. 3A and 3B, a one-dimensional work array illustrated in FIG. 8 (c) is prepared, a node at the same parallel level is traced from the root, and the traced node is sequentially stored in the work array. The process is realized by the processes in steps S309 through S313 in FIGS. 4A and 4B. These processes are the same as the processes in steps S309 through S313 illustrated in FIGS. 3A and 3B in the memory allocation chain generating process. As a result of the processes, a result acquired in the work array in the example illustrated in FIG. 8 corresponding to FIG. 14 is expressed by the equation (7) above.

If the work array is determined as described above, the node of each work array element work(n) is sequentially retrieved in the inverse order of tracing while decreasing by one from n=nodeend to 1 in step S408. The node sequentially retrieved from the work array is added to the node chain as the second task chain. As a result, the node chain is expressed as follows $$\text{node chain} = \{11 \rightarrow 12 \rightarrow 13 \rightarrow 14 \rightarrow 15 \rightarrow 16 \rightarrow 17 \rightarrow 18 \rightarrow 19 \rightarrow 20 \rightarrow 10 \rightarrow 21\} \tag{12}$$

By the process above, the subtree chain as the first task chain and the node chain as the second task chain determine the execution order of nodes in executing a task.

FIG. 5 is a flowchart of the operation of the detailed LDL^T decomposition executing process in the step 8 above performed by the LDL^T decomposition execution unit 104 in FIG. 1. In this example, each node connected to each task chain is retrieved by the number of parallel threads in order of the subtree chain and the node chain, and is assigned to the task of each thread.

In FIG. 5, first in step S501, the number of tasks to be generated is equal to the number of #thread. The processes in steps S502 through S512 are independently performed for each thread.

In each thread, in step S502, each value of the variable snode and the variable nnode is initialized to 0.

Next, first in the first thread, the subtree chain and the node chain generated by the task chain generation unit 103 in FIG. 1 are locked in step S503. Hereafter, until the first thread unlocks the subtree chain and the node chain, the second thread awaits the access to the subtree chain and the node chain.

In the first thread, it is determined in step S504 whether or not there is a node in the subtree chain.

If there is a node in the subtree chain and the determination in step S504 is YES, the leading node of the subtree chain is retrieved in the first thread in step S505, the node number is set to the variable snode, then the node after the subtree chain is set as a leading node. Assume that the chain 1 is the subtree chain in the data structure illustrated in FIG. 8 (a), and the subtree chain can be acquired as expressed by the equation (11) above. In this case, the register 801 in FIG. 8 (a) stores the array position corresponding to the node 4 on the one-dimensional node array 800. In addition, the array position corresponding to the node 4 on the one-dimensional node array 800 stores in the array position corresponding to the node 7 on the one-dimensional node array 800. The array position corresponding to the node 7 on the one-dimensional node array 800 stores null data. In this example, in the first thread, the array position stored in the register 801 is set as the node number of the node 4 in the variable snode in step S505. Then, the array position of the node 7 stored in the array position corresponding to the node 4 on the one-dimensional node array 800 accessible from the register 801 is newly set in the register 801.

In the first thread, the subtree chain and the node chain are unlocked in step S508 after the process in step S505. As a result, in the second thread executed in parallel with the first thread, the subtree chain and the node chain can be accessed.

Then, in the first thread, it is determined in step S509 whether or not the value of the variable snode is 0.

Since the node number of the node 4 is set in the snode in step S505, the determination in step S509 is NO.

As a result, in the first thread, the updating process on each panel corresponding to each configuration node of the subtree having the node of the node number set in the variable snode as a root node is performed in step S510. That is, the LDL^T decomposition process on the basis of the equations (1) and (2) are sequentially executed. In the example above, when the node corresponding to the node number set in the variable snode is the node 4, then each configuration node of subtree having the node 4 as a root node can be the node 1, 2, 3, and 4 as illustrated in FIG. 14. The updating process on the panel for these nodes is sequentially performed in the first thread. In this case, the data group for memory assignment control as illustrated in FIG. 10 and set in step S315 in FIGS. 3A and 3B in the memory allocation chain generating process is accessed, and the memory assignment of each node is controlled.

In parallel with the control process in the first thread, a similar control process is performed in the second thread.

That is, in the second thread, the subtree chain and the node chain are locked in step S503. Hereafter, until the second thread unlocks the subtree chain and the node chain, the first thread awaits the access to the subtree chain and the node chain.

In the second thread, it is determined in step S504 whether or not there is a node in the subtree chain.

If there is a node in the subtree chain and the determination in step S504 is YES, the leading node of the subtree chain is retrieved in the second thread in step S505, the node number is set to the variable snode, then the node after the subtree chain is set as a leading node. In the process in step S505 in the first thread, the array position stored in the register 801 indicating the subtree chain in FIG. 8 (a) points to the node number of the node 7 after the node 4. As a result, in the process in step S505 in the second thread, the node number of the node 7 is set to the variable snode. Then, the null value stored in the array position corresponding to the node 7 on the one-dimensional node array 800 accessible from the register 801 is newly set in the register 801. The null value indicates that there is no more node in the subtree chain.

In the second thread, after the process in step S505, the subtree chain and the node chain are unlocked in step S508. As a result, in the first thread performed in parallel with the second thread, the subtree chain and the node chain can be accessed.

Then, in the second thread, it is determined instep S509 whether or not the value of the variable snode is 0.

Since the node number of the node 7 is set to the snode in step S505, the determination in step S509 is NO.

As a result, in the second thread, the updating process of each panel corresponding to each configuration node of the subtree having the node of the node number set in the variable snode as a root node, that is, the LDL^T decomposition process, is sequentially performed in step S510. In the example above, if the node corresponding to the node number set in the variable snode is the node 7, then each configuration node of the subtree having the node 7 as a root node can be the nodes 5, 6, and 7 as illustrated in FIG. 14. The updating process of the panel for the nodes is sequentially performed in the second thread.

As described above, the panel updating process on the configuration node group of the subtree having the node 4 registered in the subtree chain as a root node, and the panel updating process on the configuration node group of the subtree having the node 7 as a root node are performed in parallel in the first and second threads. In this case, in the above-mentioned memory allocation chain generating process, the configuration node group of the subtree having the node 4 as a root node and the configuration node group of the subtree having the node 7 as a root node are allocated to different memory storage area (pool). Therefore, the access concentration on the same memory storage area in the parallel operations of subtrees can be avoided.

In the first thread, when the panel updating process is completed on the configuration node group having the node 4 as a root node in the process in step S510, control is passed to step S502 again, and the variable snode and the variable nnode are cleared. Furthermore, in the first thread, the subtree chain and the node chain are locked in step S503.

Then, in the first thread, it is determined in step S504 whether or not there is a node in the subtree chain. In the process in step S505 in the second thread, a null value indicating that there is no more node in the subtree chain is set in the register 801 indicating the subtree chain in FIG. 8 (a). As a result, the determination in step S504 is NO, and the process in step S506 is performed in the first thread.

In step S506, it is determined whether or not there is a node in the node chain.

When there is a node in the node chain, and the determination in step S506 is YES, in the first thread, the leading node of the node chain is retrieved in step S507, the node number is set in the variable nnode, and then the node after the node chain is set as a leading node. Assume that the chain 2 is the node chain in the data structure illustrated in FIG. 8 (a), and the node chain is acquired as, for example, expressed by the equation (12). In this case, the register 802 in FIG. 8 (a) stores the array position corresponding to the node 11 on the one-dimensional node array 800. In addition, the array position corresponding to the node 11 on the one-dimensional node array 800 stores the array position corresponding to the node 12 on the one-dimensional node array 800. In the order of connection of each node in the node chain, the array position of each node stores the array position of the node to be connected next. Then, the array position corresponding to the last node stores null data. In this example, in the first thread, the array position stored in the register 802 is set in the variable nnode as the node number of the node 11 in step S507. Then, the array position of the node 12 stored in the array position corresponding to the node 11 on the one-dimensional node array 800 accessible from the register 802 is newly set in the register 802.

In the first thread, after the process in step S507, the subtree chain and the node chain are unlocked in step S508.

Then, in the first thread, it is determined in step S509 whether or not the value of the variable snode is 0. After the variable snode is cleared to 0 in step S502, the determination in step S504 is NO. Therefore, the value of the variable snode is 0 as is, and the determination in step S509 is YES.

As a result, in the first thread, it is determined in step S511 whether or not the value of the variable nnode is 0. Since the variable nnode stores the node number of the node 11 in step S507, the determination in step S511 is NO.

Thus, in the first thread, the updating process on the panel corresponding to the node 11 of the node number set in the variable nnode, that is, the LDL^T decomposition process, is performed in step S512. In this case, the data group for control of memory allocation as illustrated in FIG. 10 set in step S315 in FIGS. 3A and 3B in the memory allocation chain generating process, is accessed, and the memory allocation of each node is controlled.

In parallel to the control process in the first thread, the parallel processing is further performed in the second thread.

That is, in the second thread, the subtree chain and the node chain are locked in step S503.

Next, in the second thread, it is determined in step S504 whether or not there is a node in the subtree chain. A null value indicating that there is no more node in the subtree chain is set in the register 801 indicating the subtree chain illustrated in FIG. 8 (*a*). As a result, the determination in step S504 is NO, and the process in step S506 is performed in the second thread.

In step S506, it is determined whether or not there is a node in the node chain.

If there is a node chain and the determination in step S506 is YES, the leading node of the node chain is retrieved in the second thread in step S507, the node number is set in the variable nnode, and then the node after the node chain is set as a leading node. The array position stored in the register 802 indicating the node chain in FIG. 8 (*a*) indicates the node number of the node 12 after the node 11 by the process performed in the first thread in step S507. As a result, the node number in the node 12 is set in the variable nnode in the process performed by the second thread in step S507. Then, the array position corresponding to the node 13 stored in the array position corresponding to the node 12 on the one-dimensional node array 800 accessible by the register 802 is newly set in the register 802.

In the second thread, after the process in step S507, the subtree chain and the node chain are unlocked in step S508.

Next, in the second thread, it is determined in step S509 whether or not the value of the variable snode is 0. After the variable snode is cleared to 0 in step S502, the determination in step S504 is NO. Therefore, the value of the variable snode is 0 as is, and the determination in step S509 is YES.

As a result, in the second thread, it is further determined in step S511 whether or not the value of the variable nnode is 0. Since the variable nnode stores the node number of the node 12 in step S507, the determination in step S511 is NO.

Thus, in the second thread, the updating process on the panel corresponding to the node 12 of the node number set in the variable nnode, that is, the LDL^T decomposition process, is performed in step S512.

As described above, the first and second threads perform in parallel the panel updating process on the nodes 11 and 12 registered in the node chain after the process on the subtree chain is terminated. Hereafter, each panel updating process on the two nodes registered in the node chain is performed in parallel by the first and second threads. In this case, by the memory allocation chain generating process, the node sequentially registered in the node chain is cyclically allocated to different memory storage areas (pools). Therefore, in the parallel processing of each node, the access concentration on the same memory storage area can be avoided.

In each thread, when the panel updating process on each node is completed in the process in step S512, control is passed again to step S502. In each thread, in a series of processes in steps S503 through S512, the parallel operations are performed while retrieving one by one the nodes registered in the node chain.

In the example illustrated in FIG. 14, for example, during the panel updating process of the node 15, the nodes 11, 12, 13, and 14 are referenced, and during the panel updating process of the node 16, the nodes 12, 13, 14, and 15 are referenced. In this case, since each node having a serial number is allocated alternately to a different memory storage area (pool), the access concentration on one memory storage area can be avoided even in the panel updating process on one node by one thread.

As a result of the above-mentioned processes, when there is no node registered in the node chain, that is, when a null value is detected from the register 802 in FIG. 8 (*a*), the determination in step S506 is NO, the determination in step S509 is YES, and the determination in step S511 is YES, thereby terminating all LDL^T decomposition processes.

By the above-mentioned process of the operation flowchart illustrated in FIG. 5, the LDL^T decomposition execution unit 104 realizes the process in the step 8 above.

Described below is the case in which the number of threads performed in parallel is increased from 2 to 3.

The number of memory storage areas for which memory allocation is performed is 2 as in the case described above. That is, in the memory allocation chain generating process illustrated in FIGS. 3A and 3B, the same result as the example above is output.

When the number of threads is 3, the number of elements is less than 3 although a set of branch nodes is searched for each level in the example of the elimination tree illustrated in FIG. 14. As a result, in the task chain generating process in FIGS. 4A and 4B, a subtree chain is not generated, and only a node chain is generated. In this case, a work array to be generated can be listed as follows.

$$\text{work}=\{21|10,20|4,9,19|2,3,8,18|1,7,17|1,5,6, 16|15|14|13|12|11\} \qquad (13)$$

Thus, the following node chain is generated.

$$\text{node chain}=\{11\to12\to13\to14\to15\to16\to6\to5\to1\to17\to 7\to1\to18\to8\to3\to2\to19\to9\to4\to20\to10\to21\} \qquad (14)$$

In the parallel processing in the LDL^T decomposition executing process illustrated in FIG. 5, each node is retrieved from the node chain to three threads, and is independently executed.

First, the nodes 11, 12, and 13 are assigned to the three threads and the panel updating process is performed, and the next node 14 is assigned to a blank thread.

For example, in the updating process of the node 11, only the node 11 is accessed. In the updating process of the node 12, the nodes 11 and 12 are accessed. In the updating process of the node 13, the nodes 12 and 13 are accessed. These nodes alternately appear in the allocation chains 1 and 2 in the memory allocation chain generating process. That is, li of the memory storage area corresponding to each node is allocated after distributed to the first and second half of the memory storage area. Therefore, the concentration locally on a memory storage area by all of the three threads can be avoided.

When the process is being performed and the nodes 18, 8, and 2 are executed in parallel, the nodes 14, 15, 16, 17, and 18 are accessed in the updating process of the node 18, the nodes 5, 7, and 8 are accessed in the updating process of the node 8, and only the node 3 is accessed in the updating process of the node 3. In this case, the nodes are allocated by substantially equally distributing the nodes to two memory storage areas, for example, by allocating the nodes 3, 15, 17, and 8 to the allocation chain 1, and the nodes 5, 7, 14, 16, and 18 to the allocation chain 2. Therefore, the concentration of access can be avoided.

In the memory allocation chain generating process in FIGS. 3A and 3B performed by the memory allocation chain generation unit 102 illustrated in FIG. 1 in the above-mentioned embodiments, the number of elements of the set of branch nodes for each level which is equal to or exceeds the number of sections (memory storage areas) to which memory data is consecutively assigned is searched for. On the other hand, the configuration can be performed by exceeding the number of sections to which memory data is consecutively assigned, setting the number approximate to the number of execution threads as the number of subtrees, and searching for the number of elements of the set of branch nodes which is equal to or exceeds the number of subtrees. By the search, the distribution status of the memory allocation by the memory allocation chain generation unit 102 can match the parallel status of the number of threads by the task chain generation unit 103, thereby enabling the distribution of memory access to be effectively realized.

Figure 11:
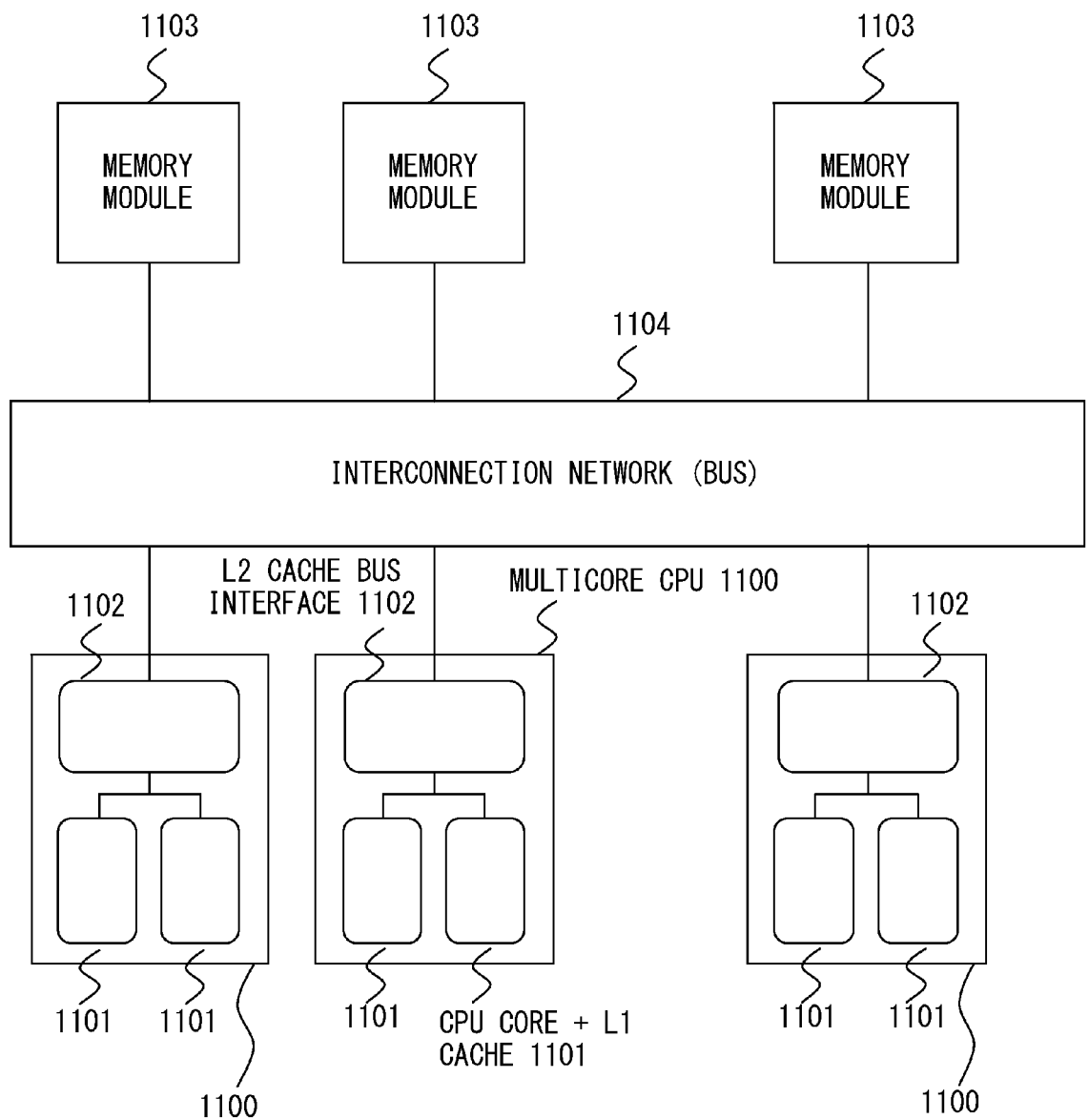
FIG. 11 is an example (1) of the configuration of the hardware system to which an embodiment of the present invention is applied.

FIG. 11 is an example (1) of a configuration of a hardware system according to an embodiment of the present invention.

A multicore CPU 1100 is connected to a plurality of memory modules 1103 via an interconnection network (bus) 1104.

The multicore CPU 1100 has plural units of CPU core+L1 cache 1101 in a CPU package, and an L2 cache bus interface 1102 commonly used by each unit of CPU core+L1 cache 1101.

The memory storage area to which each node is allocated is distributed and set to a plurality of memory modules 1103, or distributed and set to a plurality of banks in one memory module 1103.

A thread for performing the above-mentioned parallel calculation can also be configured so that it can be executed by each unit of CPU core+L1 cache 1101 in one multicore CPU 1100, or can be configured so that it can be executed by a multithread process by one unit of CPU core+L1 cache 1101.

FIG. 12 is an example (2) of a configuration of a hardware system according to an embodiment of the present invention.

The computer system illustrated in FIG. 12 includes a CPU 1201, memory 1202, an input device 1203, an output device 1204, an external storage device 1205, a portable record medium drive device 1206 into which a portable record medium 1209 is inserted, and a network connection device 1207, and these components are interconnected via a bus 1208. The configuration illustrated in FIG. 12 is an example of a computer capable of realizing the above-mentioned system, and the computer is not limited to the configuration above.

The CPU 1201 controls the entire computer. The memory 1202 can be RAM etc. for temporarily storing a program or data stored in the external storage device 1205 (or a portable record medium 1209) when the program is executed, data is updated, etc. The CPU 1201 controls the entire computer by reading the program to the memory 1202 and executing the program.

The CPU 1201 can be of a multicore type as illustrated in FIG. 11. The memory 1202 can be configured by a plurality of memory modules as illustrated in FIG. 11.

The input device 1203 is configured by, for example, a keyboard, a mouse, etc. and their interface control device. The input device 1203 detects an inputting operation by a keyboard, a mouse, etc. by a user, and notifies the CPU 1201 of the detection result.

The output device 1204 is configured by a display device, a print device, etc. and their interface control device. The output device 1204 outputs the data transmitted by the control of the CPU 1201 to a display device and a print device.

The external storage device 1205 is, for example, a hard disk storage device. It is mainly used for storing various types of data and programs.

The portable record medium drive device 1206 accommodates the portable record medium 1209 such as an optical disk, SDRAM, CompactFlash, etc. and functions as an accessory to the external storage device 1205.

The network connection device 1207 connects a communication circuit of, for example, a LAN (local area network) or a WAN (wide area network).

The system according to the present embodiments is realized by the CPU 1201 executing the program loaded with a necessary function for each component illustrated in FIG. 1. The program can be recorded and distributed on the external storage device 1205 and the portable record medium 1209, or can be acquired from a network by the network connection device 1207.

The technology to be disclosed can analyze a finite-element method, a partial differential equation, etc. for a simulation.

According to the technology to be disclosed, the access concentration of nodes configuring respective subtrees on the same memory storage area can be avoided during the parallel operations of the subtrees at the same parallel levels.

Also according to the technology to be disclosed, the access concentration of nodes on the same memory storage area can be avoided during the parallel operations of the nodes.

In addition, according to the technology to be disclosed, each thread accesses a substantially independent memory storage area. As a result, access concentration can be avoided, no bottleneck of memory access occurs, and outstanding degradation of the performance of a system can be avoided when the parallelism is increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computational method performed by a computer having a plurality of storage areas comprising:

detecting, using the computer, sets of branch nodes in a paralleled level by searching in an elimination tree from a root node, the elimination tree being a supernode obtained by analyzing a structure of a non-zero element of an input matrix prior to a Cholesky decomposition of a symmetric positive definite matrix;

searching, using the computer, in the sets of branch nodes in the paralleled level for a set of branch nodes in which a number of the branch nodes is greater than or equal to a number of a plurality of memory storage areas that is a unit of storage to which memory data is consecutively assigned, and for each subtree having a root node of a branch node included in the set of branch nodes obtained by the search, allocating a computational result of a column vector of a group of nodes forming the subtrees to a memory storage area selected from the plurality of memory storage areas on a basis of a predetermined selection rule; and allocating, using the computer, a computational result of a column vector for a group of nodes not including the group of nodes forming the subtrees corresponding to the set of branch nodes obtained in the search from among groups of nodes forming the elimination tree to a memory storage area selected on a basis of a predetermined selecting rule from among the plurality of memory storage areas so that computational results of groups of nodes in close paralleled levels are allocated to different memory storage areas.

2. The computational method according to claim 1, further comprising:

generating a first task chain for each subtree by searching for a set of branch nodes in the sets of branch nodes in which a number of branch nodes is greater than or equal to a number of threads to be executed in parallel and adding information about each subtree having a root node of a branch node included in the set of branch nodes obtained by the search to a subtree chain in units of subtree; and generating a second task chain for each subtree by connecting a group of nodes not including the group of nodes forming the subtrees corresponding to the set of branch nodes obtained in the search regarding the threads from among groups of nodes forming the elimination tree to a node chain so that the groups of nodes are grouped for each paralleled level in an order from a leaf node to a root node of the elimination, wherein each of the threads selects the information about each subtree connected to the subtree chain in a registration order, performs a computation of the column vector for a group of nodes forming the subtrees corresponding to the information, and performs in a registration order the computation of the column vector for each node connected to the node chain when there is no entry to be selected in the subtree chain.

3. A computational apparatus, comprising:

a branch node set detection unit to detect sets of branch nodes in a paralleled level by searching in an elimination tree from a root node, the elimination tree being a supernode obtained by analyzing a structure of a non-zero element of an input matrix prior to a Cholesky decomposition of a symmetric positive definite matrix;

a subtree memory storage area allocation unit to search in the sets of branch nodes in the paralleled level for a set of branch nodes in which a number of the branch nodes is greater than or equal to a number of a plurality of memory storage areas that is a unit of storage to which memory data is consecutively assigned, and for each subtree having a root node of a branch node included in the set of branch nodes obtained by the search, to allocate a computational result of a column vector of a group of nodes forming the subtrees to a memory storage area selected from the plurality of memory storage areas on a basis of a predetermined selection rule; and a node memory storage area allocation unit to allocate a computational result of a column vector for a group of nodes not including the group of nodes forming the subtrees corresponding to the set of branch nodes obtained in the search from among groups of nodes forming the elimination tree to a memory storage area selected on a basis of a predetermined selecting rule from among the plurality of memory storage areas so that computational results of groups of nodes in close paralleled levels are allocated to different memory storage areas.

4. The computational apparatus according to claim 3, further comprising:

a subtree chain generation unit to generate a first task chain for each subtree by searching for a set of branch nodes in the sets of branch nodes in which a number of branch nodes is greater than or equal to a number of threads to be executed in parallel and to add information about each subtree having a root node of a branch node included in the set of branch nodes obtained by the search to a subtree chain in units of subtrees; and a node chain generation unit to generate a second task chain for each subtree by connecting a group of nodes not including the group of nodes forming the subtrees corresponding to the set of branch nodes obtained in the search regarding the threads from among groups of nodes forming the elimination tree to a node chain so that the groups of nodes are grouped for each paralleled level in an order from a leaf node to a root node of the elimination tree, wherein each of the threads selects the information about each subtree connected to the subtree chain in a registration order, performs a computation of the column vector for a group of nodes forming the subtrees corresponding to the information, and performs in a registration order the computation of the column vector for each node connected to the node chain when there is no entry to be selected in the subtree chain.

5. A non-transitory computer-readable record medium which records a program used to direct a computer, to perform a process, the process comprising:

detecting sets of branch nodes in a paralleled level by searching in an elimination tree from a root node, the elimination tree being a supernode obtained by analyzing a structure of a non-zero element of an input matrix prior to a Cholesky decomposition of a symmetric positive definite matrix;

searching in the sets of branch nodes in the paralleled level for a set of branch nodes in which a number of the branch nodes is greater than or equal to a number of a plurality of memory storage areas that is a unit of storage to which memory data is consecutively assigned, and for each subtree having a root node of a branch node included in the set of branch nodes obtained by the search, allocating a computational result of a column vector of a group of nodes forming the subtrees to a memory storage area selected from the plurality of memory storage areas on a basis of a predetermined selection rule; and allocating a computational result of a column vector for a group of nodes not including the group of nodes forming the subtrees corresponding to the set of branch nodes obtained in the search from among groups of nodes forming the elimination tree to a memory storage area selected on a basis of a predetermined selecting rule from among the plurality of memory storage areas so that computational results of groups of nodes in close paralleled levels are allocated to different memory storage areas.

6. The record medium according to claim 5, wherein the process further comprising:

generating a first task chain for each subtree by searching for a set of branch nodes in the sets of branch nodes in which a number of branch nodes is greater than or equal to a number of threads to be executed in parallel and adding information about each subtree having a root node of a branch node included in the set of branch nodes obtained by the search to a subtree chain in units of subtrees; and generating a second task chain for each subtree by connecting a group of nodes not including the group of nodes forming the subtrees corresponding to the set of branch nodes obtained in the search regarding the threads from among groups of nodes forming the elimination tree to a node chain so that the groups of nodes are grouped for each paralleled level in an order from a leaf node to a root node of the elimination tree, wherein each of the threads selects the information about each subtree connected to the subtree chain in a registration order, performs a computation of the column vector for a group of nodes forming the subtrees corresponding to the information, and performs in a registration order the computation of the column vector for each node connected to the node chain when there is no entry to be selected in the subtree chain.

* * * * *